United States Patent [19]
Erickson et al.

[11] Patent Number: 5,109,278
[45] Date of Patent: Apr. 28, 1992

[54] AUTO FREEZE FRAME DISPLAY FOR INTRUSION MONITORING SYSTEM

[75] Inventors: Charles H. Erickson, Woodridge; Peter A. Erio, Morris; James E. Kase, Tinley Park, all of Ill.

[73] Assignee: Commonwealth Edison Company, Chicago, Ill.

[21] Appl. No.: 548,847

[22] Filed: Jul. 6, 1990

[51] Int. Cl.$^5$ .............................. H04N 7/18
[52] U.S. Cl. ................... 358/108; 358/181; 358/903
[58] Field of Search ............ 358/108, 181, 87, 93, 358/105

[56] References Cited

U.S. PATENT DOCUMENTS

| | | |
|---|---|---|
| 3,531,588 | 9/1970 | Kartchner . |
| 4,370,675 | 1/1983 | Cohn . |
| 4,408,224 | 10/1983 | Yoshida . |
| 4,458,266 | 7/1984 | Mahoney . |
| 4,511,886 | 4/1985 | Rodriguez ............ 358/108 X |
| 4,651,143 | 3/1987 | Yamanaka . |
| 4,772,945 | 9/1988 | Tagawa et al. .......... 358/108 |
| 4,774,470 | 9/1988 | Araki ................... 358/108 |
| 4,814,869 | 3/1989 | Oliver, Jr. . |
| 4,876,597 | 10/1989 | Roy et al. . |

OTHER PUBLICATIONS

Tek TMD 1000 Video Motion Detector System; borchure Aug. '89.
Adpro Pro 1600 Video Alert System—Anything less is not security; brochure.
Adpro Pro 1600 Catalog 1—1 through 4—4.
Nuclear News, Dec. 1989, pp. 43–48.
Special Product-High Level Computer Aided Video Surveillance is Here-CCTV Magazine-Sep./Oct. 1989, pp. 18–19.
A New Vision on Security-Movicom-brochure.
Hymatom-RJS Industries-Movicom-Summary Features-Brochure Oct. '89.
Movicom-The Complete Video Protection System-A New Security Concept Brochure-P.O. Box 3426 Santa Fe Springs Calif. 90670.
Company Profiles-Hymatom/FJX Industries-Reader Service Card No. 140 Oct. 1989/Security Sales-pp. 77–83.
Nuclear Materials Management, 30th Annual Meeting Proceedings Volume XVII-Orland Fla. U.S.A. Jul. 9-12, 1989.
Advanced Small Site Program-Charles E. Ringler--Sandia National Laboratories Albuquerque, New Mexico USA.
Intrusion Detection Systems, Second Edition, Robert L. Barnard Butterworths Copyright 1988-pp. 18–21.
Intrusion Detection Systems, Second Edition, Robert L. Barnard Butterworths Copyright 1988-pp. 329–330.
Sensor Technology, Jan. 1990, pp. 35–36.
An Unmanned Watching System Using Video Cameras; IEEE Computer Applications in Power, Apr. 1990, pp. 20–24.
Video Multiplexer Card (article) Electronic Engineering Times Dec. 11, 1989.
Data Translation, IBM Personal System/2, Eight--Channel Video Multiplexer DT2959, Brochure.

*Primary Examiner*—Victor R. Kostak
*Attorney, Agent, or Firm*—Steven T. Naumann; William A. Webb

[57] ABSTRACT

A video monitoring system responds to an intrusion alarm by automatically presenting still video images of the zone of the alarm at or about the time of the alarm. The operator can control magnification and contrast to enhance the displayed image. In one system the displayed images are images taken at times both before and after the alarm was received by the monitoring system.

51 Claims, 18 Drawing Sheets

Microfiche Appendix Included
(12 Microfiche, 394 Pages)

FIG 17a

| $t=n-3i-3x$ | $t=n-2i-3x$ |
|---|---|
| $t=n-i-3x$ | $t=n-3x$ |

Buffer 1 Camera 1 Images

| $t=n-3i-2x$ | $t=n-2i-2x$ |
|---|---|
| $t=n-i-2x$ | $t=n-2x$ |

Buffer 2 Camera 2 Images

| $t=n-3i-x$ | $t=n-2i-x$ |
|---|---|
| $t=n-i-x$ | $t=n-x$ |

Buffer 3 Camera 3 Images

| $t=n-3i$ | $t=n-2i$ |
|---|---|
| $t=n-i$ | $t=n$ |

Buffer 4 Camera 4 Images

FIG 17b

| $t=n+i-3x$ | $t=n-2i-3x$ |
|---|---|
| $t=n-i-3x$ | $t=n-3x$ |

Buffer 1 Camera 1 Images

| $t=n+i-2x$ | $t=n-2i-2x$ |
|---|---|
| $t=n-i-2x$ | $t=n-2x$ |

Buffer 2 Camera 2 Images

| $t=n+i-x$ | $t=n-2i-x$ |
|---|---|
| $t=n-i-x$ | $t=n-x$ |

Buffer 3 Camera 3 Images

| $t=n+i$ | $t=n-2i$ |
|---|---|
| $t=n-i$ | $t=n$ |

Buffer 4 Camera 4 Images

FIG 18a

| | |
|---|---|
| 1 2 / 3 4<br>CAMERA 5<br>ALARM #1 | 1 2 / 3 4<br>CAMERA 2<br>ALARM #2 |
| 1 2 / 3 4<br>CAMERA 12<br>ALARM #3 | 1 2 / 3 4<br>CAMERA 7<br>ALARM #4 |

FIG 18b

| | | | |
|---|---|---|---|
| CAMERA 1<br>ALARM #5 | CAMERA 2<br>ALARM #18 | CAMERA 5<br>ALARM #6 | CAMERA 6<br>ALARM #7 |
| CAMERA 3<br>ALARM #8 | CAMERA 4<br>ALARM #9 | CAMERA 7<br>ALARM #10 | CAMERA 8<br>ALARM #11 |
| CAMERA 9<br>ALARM #12 | CAMERA 10<br>ALARM #13 | CAMERA 13<br>ALARM #14 | CAMERA 14<br>ALARM #15 |
| CAMERA 11<br>ALARM #16 | CAMERA 12<br>ALARM #17 | CAMERA 15<br>ALARM #19 | CAMERA 16<br>ALARM #20 |

AUTO FREEZE FRAME DISPLAY FOR INTRUSION MONITORING SYSTEM

IDENTIFICATION OF APPENDICES

Appendices A-E form part of this specification. These Appendices include material which is subject to copyright protection. The copyright owner has no objection to the facsimile reproduction by anyone of the patent disclosure, as it appears in the Patent and Trademark Office patent files or records, but otherwise reserves all copyright rights whatsoever. Appendices A through E are in the form of a microfiche appendix, having a total number of 12 microfiche and a total of 394 frames.

BACKGROUND OF THE INVENTION

This invention relates to a monitoring system that automatically displays still images related to an intrusion alarm in order to enhance the ability of security personnel to assess the nature of the alarm.

Intrusion detection systems are widely used to control and monitor access to sensitive areas such as for example commercial nuclear generating stations. Typically, such detection systems will monitor a perimeter divided into zones. Each zone will have one or more sensors designed to detect intrusion into the zone as well as one or more video cameras positioned to observe an intruder who has triggered a sensor in the respective zone.

FIG. 1 shows a schematic representation of one such prior art intrusion detection system. The system of FIG. 1 monitors a portion of a perimeter which includes three zones: Zone 1, Zone 2, Zone 3. Each of the zones is at least partially defined by a respective one of two perimeter fences 10, 12. As shown in FIG. 1, three sensor systems S1, S2, S3 monitor the respective zones, and each of the sensor systems S1, S2 S3 generates a respective alarm signal A1, A2, A3 when triggered. The sensor systems S1, S2, S3 may include either active sensors, passive sensors, or some combination. Active sensors such as microwave sensors detect intrusions by sensing changes in an energy field generated by the sensor. Passive sensors, such as heat detectors, sense intrusions by detecting environmental changes such as the heat associated with a person or other intruder. Further details on such sensors may be found in R. L. Barnard, *Intrusion Detection Systems* (2nd Edition, 1988) at pages 19-21.

The system of FIG. 1 further includes a number of video cameras VC1-VC6 that generate respective video signals V1-V6. In the illustrated system there are two video cameras associated with each of the zones, and the video cameras may be positioned either inside or outside the respective zone. Any number of cameras may be used to cover a zone, depending upon the physical characteristics of the zone and good security practice, and the number of video cameras used per zone may be either greater or lesser than the number shown in FIG. 1. The cameras may be any conventional video camera that generates a standard RS170 signal. However, higher quality cameras will generate better pictures because they operate with a greater bandwidth that allows more levels of gray to be used in the final digitized picture described below.

In the past, intrusion detection systems have been used in which a central control system automatically responds to the alarm signals A1-A3 to record on video tape the video signals V1-V6 associated with the zone in which the intrusion was detected. The security guard is then expected to rewind the video cassette recorder to view the zone at the time of the intrusion. This approach relies on the security guard to rewind the VCR and to view the recorded video images for each alarm. In the event there are a number of false alarms, the security guard may not always choose to complete the time consuming job of rewinding the VCR and then watching it. Furthermore, a VCR that stores a conventional video image is not well suited to record quickly changing scenes. In the event of a moving car passing through a zone, only a few frames may have sufficient detail to allow details such as the license number of the car to be seen.

Another problem encountered with previous video monitoring systems is that in the event of multiple alarms the first alarm may impede or prevent the security guard from viewing video information regarding subsequent alarms. This weakness can be exploited by false alarms which may delay or prevent the security guard from seeing the real intrusion.

Yet another problem of certain prior art intrusion detection systems is related to the fact that alarm signals may not be reported at the central station promptly. In this case, a quickly changing scene may have changed substantially before the controller can begin to record video signals from the appropriate video cameras. When this happens critical information that would be useful to a security guard in assessing an alarm is irretrievably lost.

Accordingly, it is a primary object of this invention to provide an improved intrusion detection system which automatically displays still video images of a zone associated with an alarm to allow a security guard to assess the alarm.

It is a further object of this invention to provide such a system in which multiple still video images corresponding to multiple successive alarms are stored and readily accessible to a security guard. This allows the security guard to view still video images associated with successive alarms quickly and easily.

It is another object of this invention to provide such an intrusion detection system which stores still video images associated with an alarm prior to reception of the alarm by a central control system for automatic retrieval and display in the event of an alarm.

It is another object to provide such a system in which the magnification and contrast of the displayed video images can be adjusted easily by a security guard.

SUMMARY OF THE INVENTION

This invention relates to improvements to an intrusion alarm system of the type comprising means for generating a plurality of alarm signals, each associated with a respective zone, means for generating a plurality of video signals, each associated with a respective zone, and means for transmitting the video signals and the alarm signals to a central station.

According to a first aspect of this invention, at least one video image digitizer is situated at the central station and is operative to store at least one digitized still video image. A controller, also situated at the central station, is responsive to the alarm signals to apply selected ones of the video signals to the image digitizer such that promptly after one of the alarm signals is generated the respective video signal is automatically applied to the image digitizer. A display is coupled to the image digitizer to display the digitized video image stored by the image digitizer, thereby automatically presenting to an operator a still video image of the zone associated with an alarm taken at a time immediately after the alarm.

According to a second feature of this invention, at least one video image digitizer is situated at the central station and operative to store a plurality of sets of digitized still video images on an ongoing basis, each set associated with a respective one of the video signals, each stored digitized still video image corresponding to a respective image time. A controller is situated at the central location and is responsive to the alarm signals to automatically select at least one of the stored digitized still video images for display. The selected stored digitized still video image corresponds for each of the alarm signals to the zone associated with that alarm signal, and to an image time prior to the time the respective alarm signal was received by the controller. A display is coupled to the video image digitizer to automatically display the selected stored digitized still video image, thereby automatically providing a security guard with a view of the zone associated with an alarm signal as the zone appeared at a time prior to the time when the alarm signal was received by the controller.

The preferred embodiments described below reduce the workload of security personnel by completely eliminating the need to rewind a VCR to view a zone in which a sensor has generated an alarm. This is because the corresponding video signals are automatically digitized and automatically displayed as still images. The systems described below automatically record multiple still video images associated with subsequent alarms, and thereby ensure that a first alarm will not immobilize the system and prevent it from recording information related to subsequent alarms. The second preferred embodiment disclosed below records still video images on an ongoing basis. When an alarm is received, the controller selects a previously recorded still video image in the zone corresponding to the alarm and displays a still video image of the zone prior to the time the alarm was actually received by the controller. This feature is of particular importance when the delay between the generation of the alarm by the respective sensor and the receipt of the alarm by the controller is relatively long.

The invention itself, together with further objects and attendant advantages, will best be understood by reference to the following detailed description, taken in conjunction with the accompanying drawings.

BRIEF DESCRIPTION OF THE DRAWINGS

FIGS. 17a, 17b, 18a, 18b are schematic representations of stored still video images in the embodiment of FIG. 9.

DETAILED DESCRIPTION OF THE PRESENTLY PREFERRED EMBODIMENTS

Figure 1:
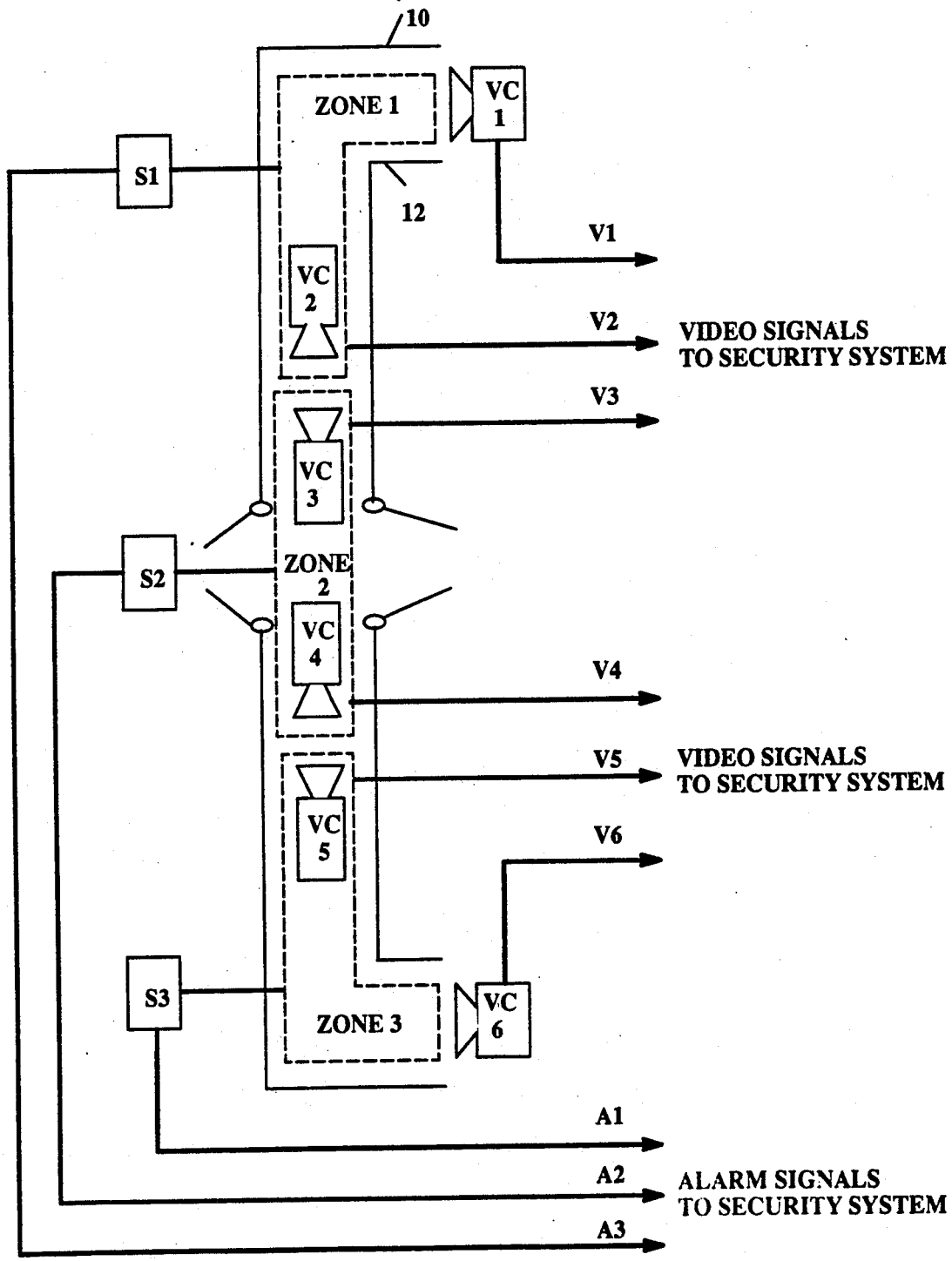
FIG. 1 is a schematic representation of a sensor and video camera arrangement of a prior art intrusion detection system.
Figure 2:
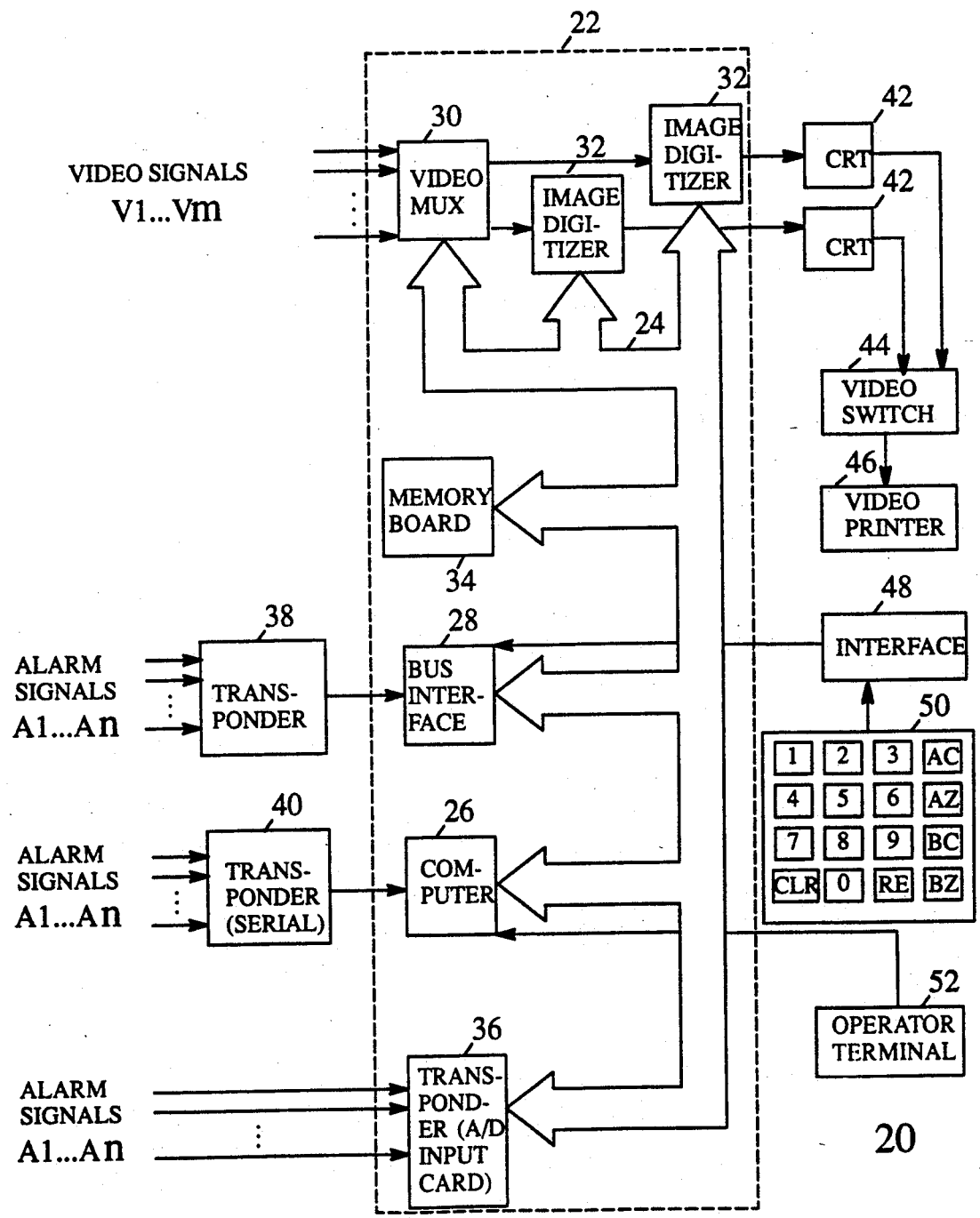
FIG. 2 is a block diagram of a first preferred embodiment of this invention.

Turning now to the drawings. FIG. 2 shows a block diagram of a first preferred embodiment 20 of the monitoring system of this invention. The monitoring system 20 includes a computer system 22 that responds to alarm signals A1-An of the type described above in conjunction with FIG. 1 and video signals V1-Vm of the type described above in conjunction with FIG. 1. In this embodiment, there are two video signals for each alarm signal, as in the arrangement of FIG. 1. In general terms, the computer system 22 responds to one of the alarm signals by selecting the pair of video signals associated with the alarm signal, digitizing the selected video signals and then automatically presenting the resulting still video images on a CRT for viewing by a security guard. As described below the guard can control magnification and contrast of the displayed still video images, and can also view images associated with subsequent alarms on request.

As shown in FIG. 2, the computer system 22 includes a bus 24 that interconnects the various components of the computer system 22, including a computer 26 and related components 28–36, as described in detail below. All of the components 26–36 are preferably mounted in a single computer chassis to reduce the cost and size of the system.

The bus 24 is preferably a high speed interfacing system which is used to interconnect data processing, peripheral control and data storage devices in a closely coupled hardware configuration. The preferred embodiments employ a bus that uses 16 bit transfers at a rate of 20 megabytes per second. A bus using 32 bit transfers at a rate of 40 megabytes per second may be used as well as buses with higher transfer rates. Use of this high speed bus to interconnect the computer 26 and related components 28–36 results in a monitoring system 20 that transfers data and control signals at a speed well suited to an intrusion monitoring system.

Many existing intrusion monitoring systems use a low speed RS-232 serial-communication link which requires each individual component to have its own processor or controller. These processors or controllers provide an interface between data processing elements and the RS-232 link. Use of a high speed bus 24 reduces the complexity of the monitoring system by eliminating controllers. Further, because all related components 28–36 are directly accessible by one processor, the computer system 22 with bus 24 allows a reduction in the number of instructions to the computer 26. Therefore, communication with other related components 28–36 by the computer 26 is performed directly using several lines of code rather than indirectly using hundreds of lines of code. Thus, the computer system 22 provides a dual savings in communication time as the shorter instruction set can be processed faster and a higher transfer rate is available.

Use of bus 24 also allows the computer system 22 to make use of very high speed transponders, such as discussed below, without introducing additional delays.

A number of inputs are provided to the computer system 22, as follows. The video signals V1-Vm are supplied in parallel to a video multiplexer 30 which communicates with the computer 26 via the bus 24. Under computer control, the multiplexer 30 selects two of the video signals V1-Vm and supplies them to respective ones of the two image digitizers 32. The image digitizers 32 are conventional devices explained in greater detail in conjunction with FIG. 3 which operate to take a single video frame, digitize it and store it for later display. Image digitizers may on occasion be referred to as "frame grabbers".

A second set of inputs to the computer system 22 is the alarm signals A1-An such as those described above in conjunction with FIG. 1. The alarm signals A1-An can take many forms. The computer system 22 is designed to receive the alarm signals A1-An in any one of three forms. The transponder 38 is coupled to a bus interface 28 and operates as a multiplexer to sense any change in state of any of the alarm signals and to report an alarm to the computer 26, in this case via an INTEL pulse width timed transmission (XFER). The transponder 38 can be referred to as a VME/XFER alarm transponder. Alternately the alarm signals A1-An may be applied to the computer system 22 via a serial transponder 40. Thirdly, the alarm signals A1-An may be applied as dry contact switches to an analog/digital input card alarm transponder 36 which is mounted on the bus 24. Depending upon the security system used, all three types of transponders 38, 40, 36 or any combination thereof may be used to supply alarm information to the computer 26. Of course, other signal protocols and associated transponders may be substituted if desired.

The third input to the computer system 22 is supplied by a keypad 50 via a keypad interface 48 coupled to the bus interface 28. The keypad 50 is a 16 key device having ten keys for the digits 0-9 and six keys marked as shown in FIG. 2 and described below. The keypad 50 is used by the operator in controlling the contrast, magnification and identity of the displayed screen.

The fourth input to the computer system 22 is supplied by operator terminal 52 used by an operator in housekeeping operations such as in programming the computer 26 to associate the video signals V1-Vm with respective ones of the alarm signals A1-An.

As shown in FIG. 2 the computer system 22 has two video outputs which drive two CRTs 42. The screen shown on either of the CRTs 44 may be selected via video switch 44 for printing by a video printer 46.

Figure 3:
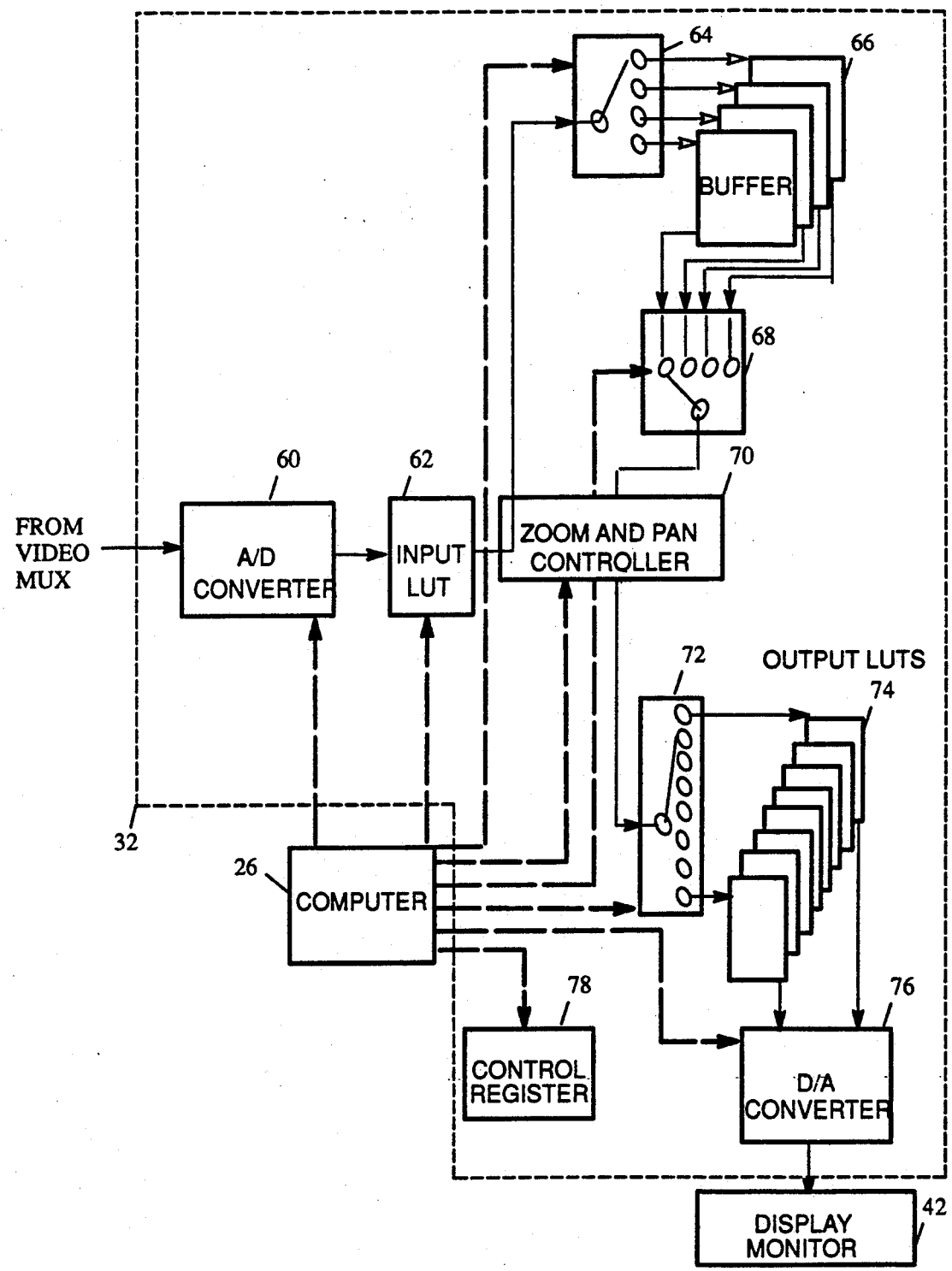
FIG. 3 is a more detailed block diagram of one of the image digitizers of FIG. 2.

The operation of one of the image digitizers 32 will be described in conjunction with FIG. 3. The digitizer 32 receives a video signal from the video multiplexer 30 as described above. This video signal is applied to an A/D converter 60 which digitizes the video signal and supplies the digitized result to an input look-up table (LUT) 62. The look-up table 62 is linearly programmed to assign a digital value indicative of the brightness of the associated portion of the video signal. In this case, the look-up table 62 uses one of 256 values, with black being assigned a value of 0 and white being assigned a value of 255. The output of the look-up table 62 is applied via a zoom and pan controller 70 and a switch 64 to one of four buffers 66 for storage. Each of the buffers 66 stores a single frame of video information in this embodiment.

When one of the frames of video information in one of the buffers 66 is to be displayed, the respective buffer 66 is selected via a switch 68, and the stored digital information is applied via the zoom and pan controller 70 and a switch 72 to one of eight output look-up tables 74. The zoom and pan controller 70 controls the magnification of the displayed screen. The output look-up tables 74 determine the contrast of the displayed screen. Each of the output look-up tables 74 stores a separate table. Typically, one will be programmed as a linear look-up table, others will be programmed to improve the visibility of objects in a dark screen, and others will be programmed to improve the visibility of objects in a light screen. The output of the selected look-up table 74 is then applied via a D/A converter 76 to the respective CRT 42. The control register 78 is used for control functions and to select respective components.

Having described the structure of the monitoring system 20 its operation will now be explained in conjunction with the flow charts of FIGS. 4-8.

Figure 7:
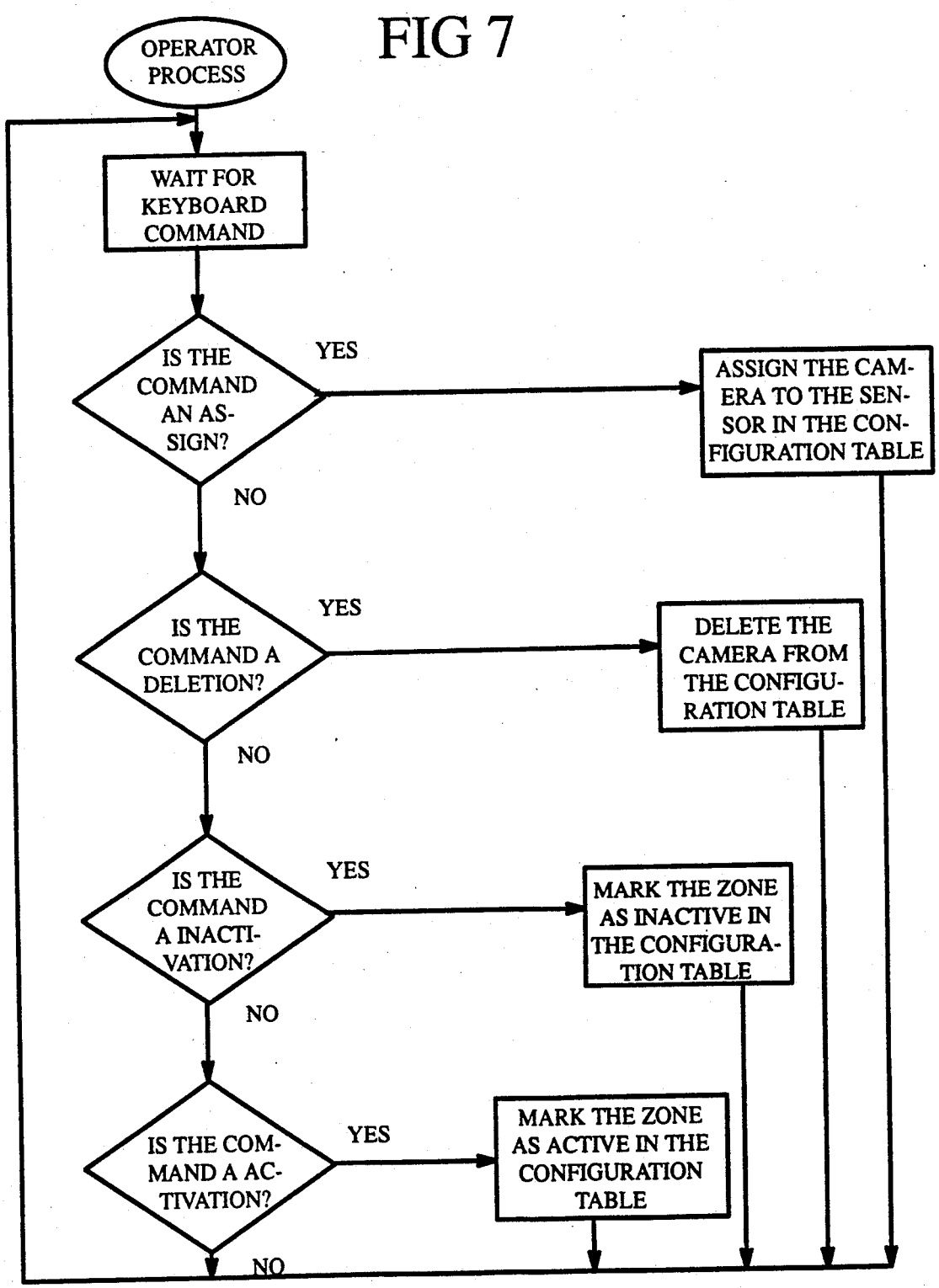

As a preliminary matter, before the monitoring system 20 goes into service the operator terminal 52 should be used to assign individual ones of the video signals V1-Vm to individual ones of the alarm signals A1-An. This can be done for example in using the Operator Process of FIG. 7. As shown in FIG. 7, the Operator Process waits for a keyboard command from the operator terminal 52. If the command is an assignment, the process assigns the selected video signal V1-Vm to the selected alarm signal A1-An in a configuration table maintained by the computer 26. If the keyboard command is a deletion, the selected video signal V1-Vm is deleted from the configuration table. If the keyboard command is an inactivation an entire zone is marked as inactive in the configuration table, and alarms from that zone are ignored. Finally, if the keyboard command is an activation, the respective zone is marked as active in the configuration table. Thus, the configuration table associates individual ones of the video signals V1-Vm with individual ones of the alarm signals A1-An. Typically, the one or more video signals associated with any alarm are generated by one or more cameras focussed on the region monitored by the respective sensor.

Figure 4:
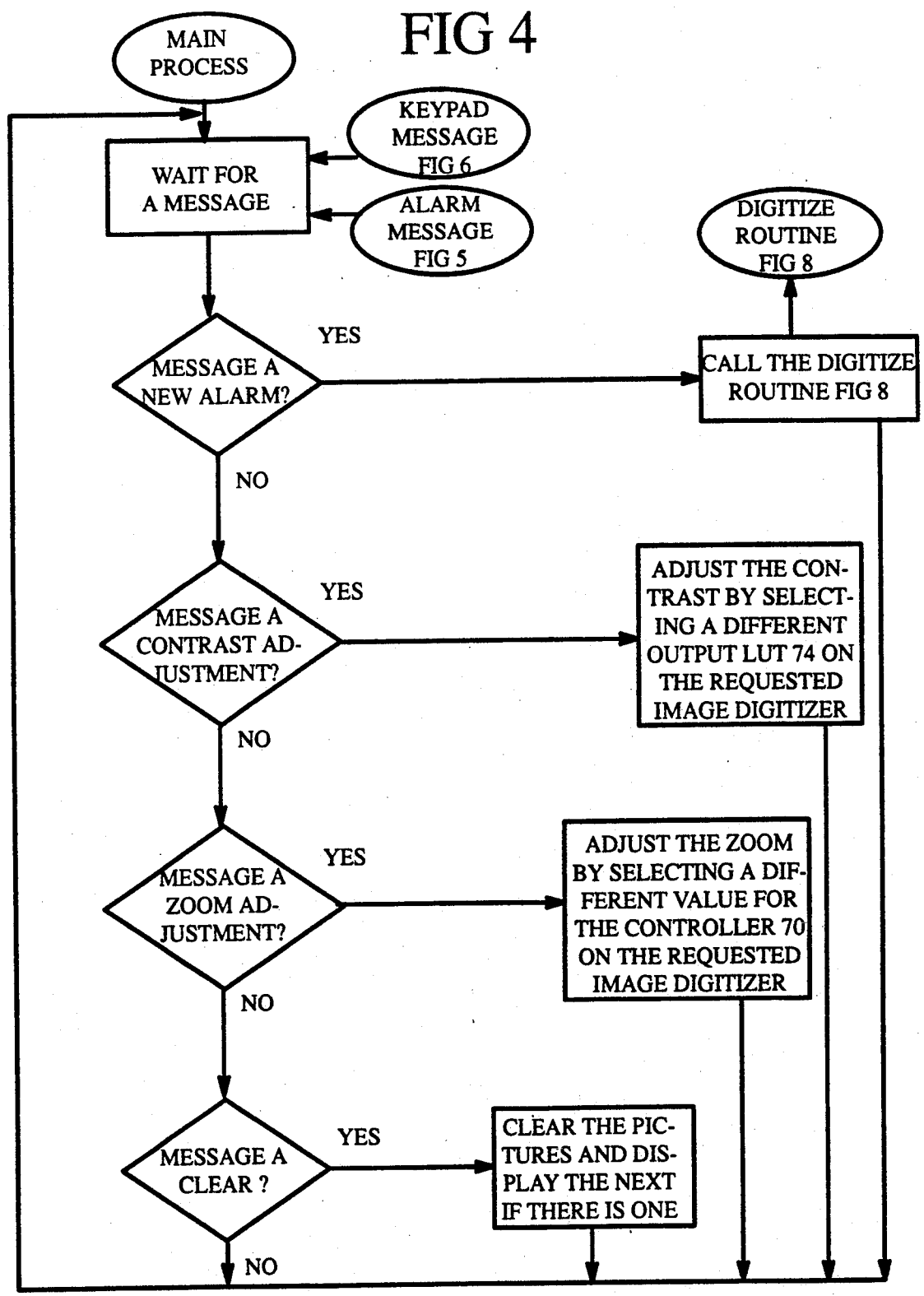
FIGS. 4–8 are flow charts of programs executed by the computer of FIG. 2.

As shown in FIG. 4, the Main Process executed by the computer 26 begins by waiting for a message. The two types of messages implemented in this system are keypad messages (FIG. 6) and alarm messages (FIG. 5).

Figure 5:
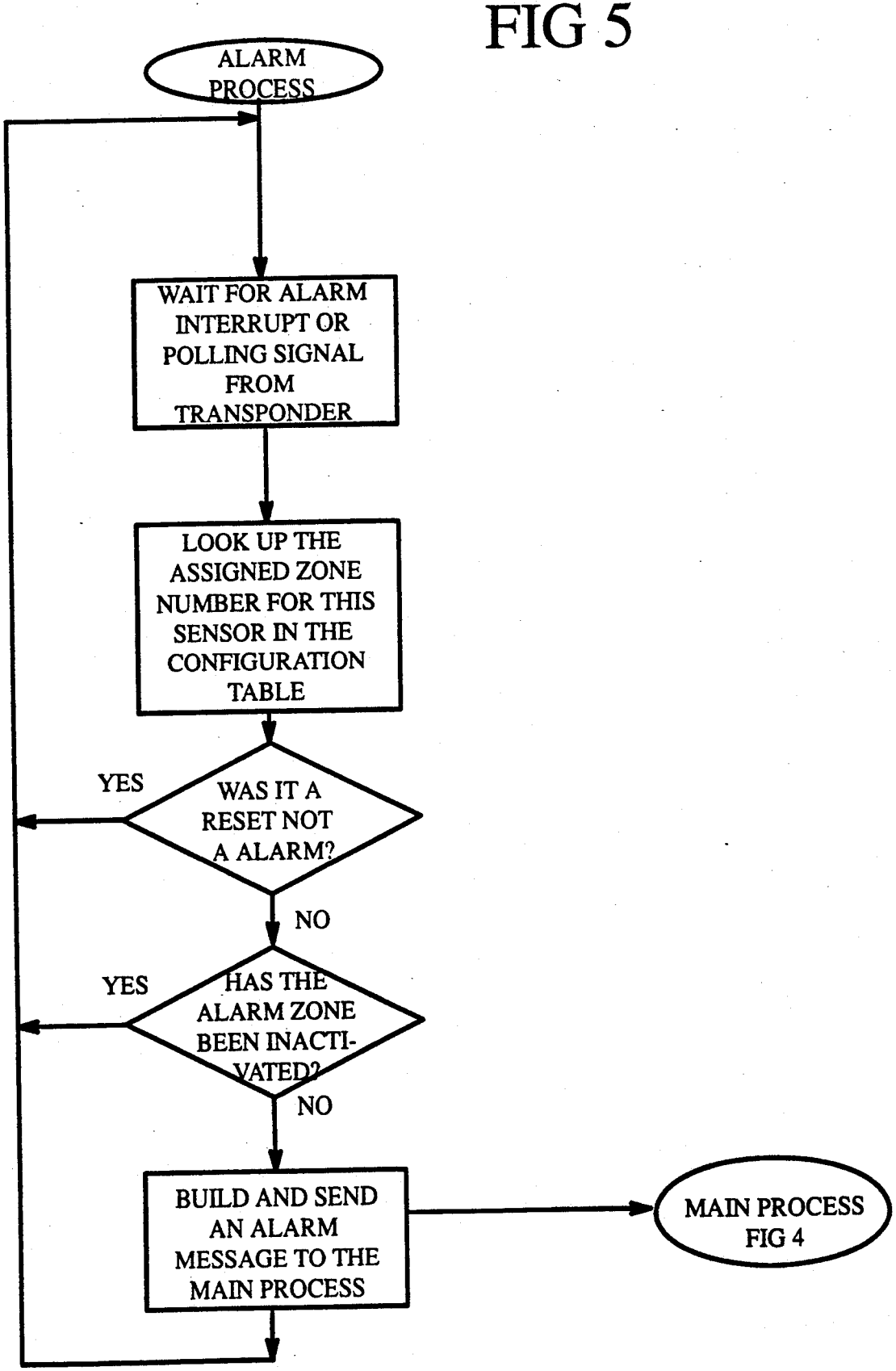

As shown in FIG. 5, the Alarm Process executed by the computer 26 waits for an alarm signal from one of the transponders. Depending upon the transponder, this may be done either by polling the transponder repetitively, or by waiting for an interrupt generated by the transponder. Once an alarm has been received from one of the transponders, the Alarm Process then looks up the assigned zone number for the received alarm signal in the configuration table. The process then checks to determine whether the signal received was a reset and not an alarm. If so, the process returns to await a next alarm signal. Next, the process checks to determine whether the zone for the received alarm has been inactivated. If so, the process returns to await a next alarm signal. Otherwise (if the zone has not been inactivated and the alarm is not reset) the process builds and sends an alarm message to the Main Process of FIG. 4. Thus, an alarm message will be automatically generated whenever one of the alarm signals A1-An indicates a new alarm in an active zone.

Figure 6:
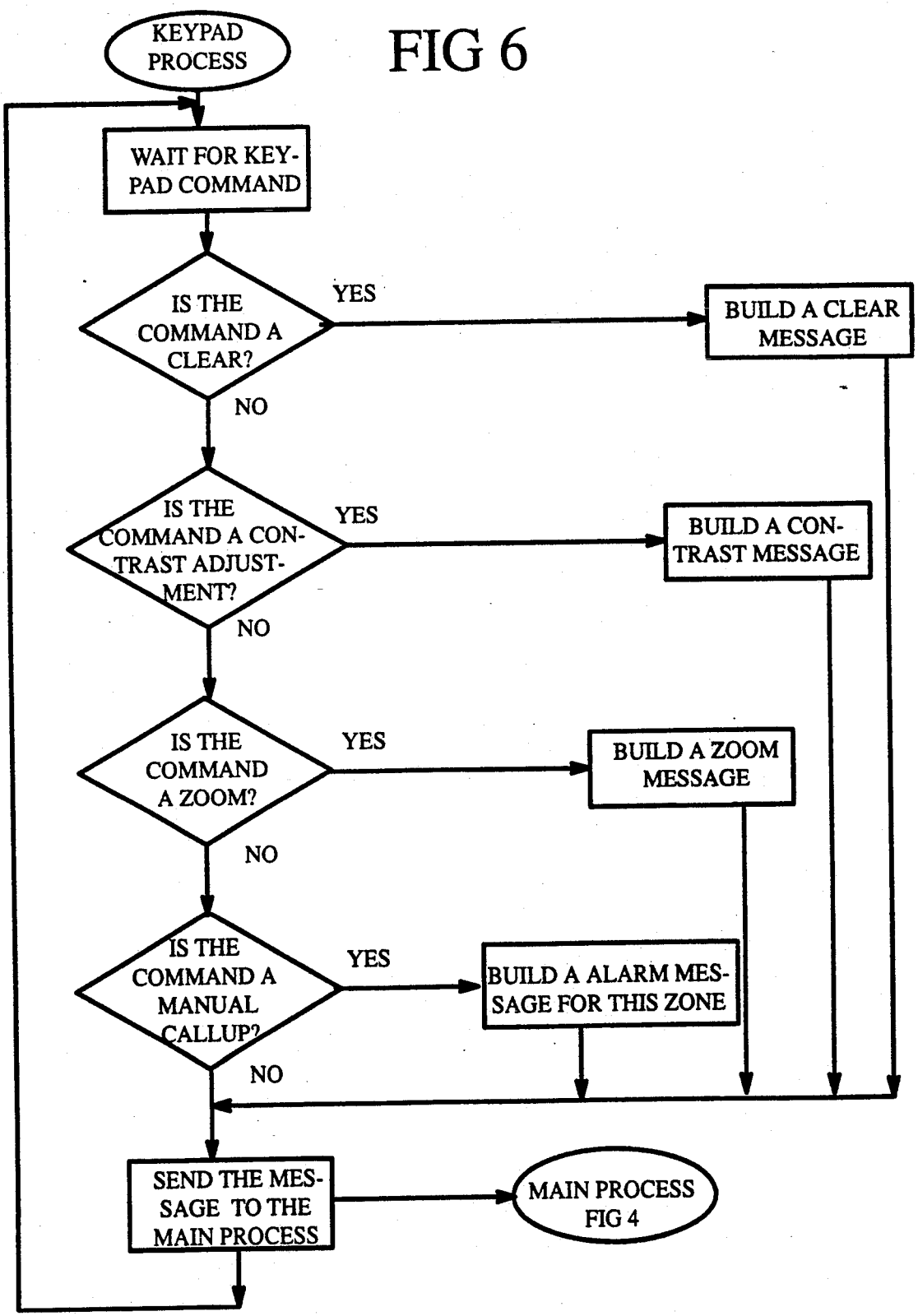

The Keypad Process shown in FIG. 6 begins by awaiting a keypad command. Once a command is received an appropriate message is built for the Main Process of FIG. 4. As shown in FIG. 4, this message may be a clear message, a contrast adjustment message, a zoom message, or an alarm message. The Keypad Process responds to manual call up command by building an alarm message for the requested zone. Once the appropriate message has been built, the message is sent to the Main Process of FIG. 4.

Figure 8:
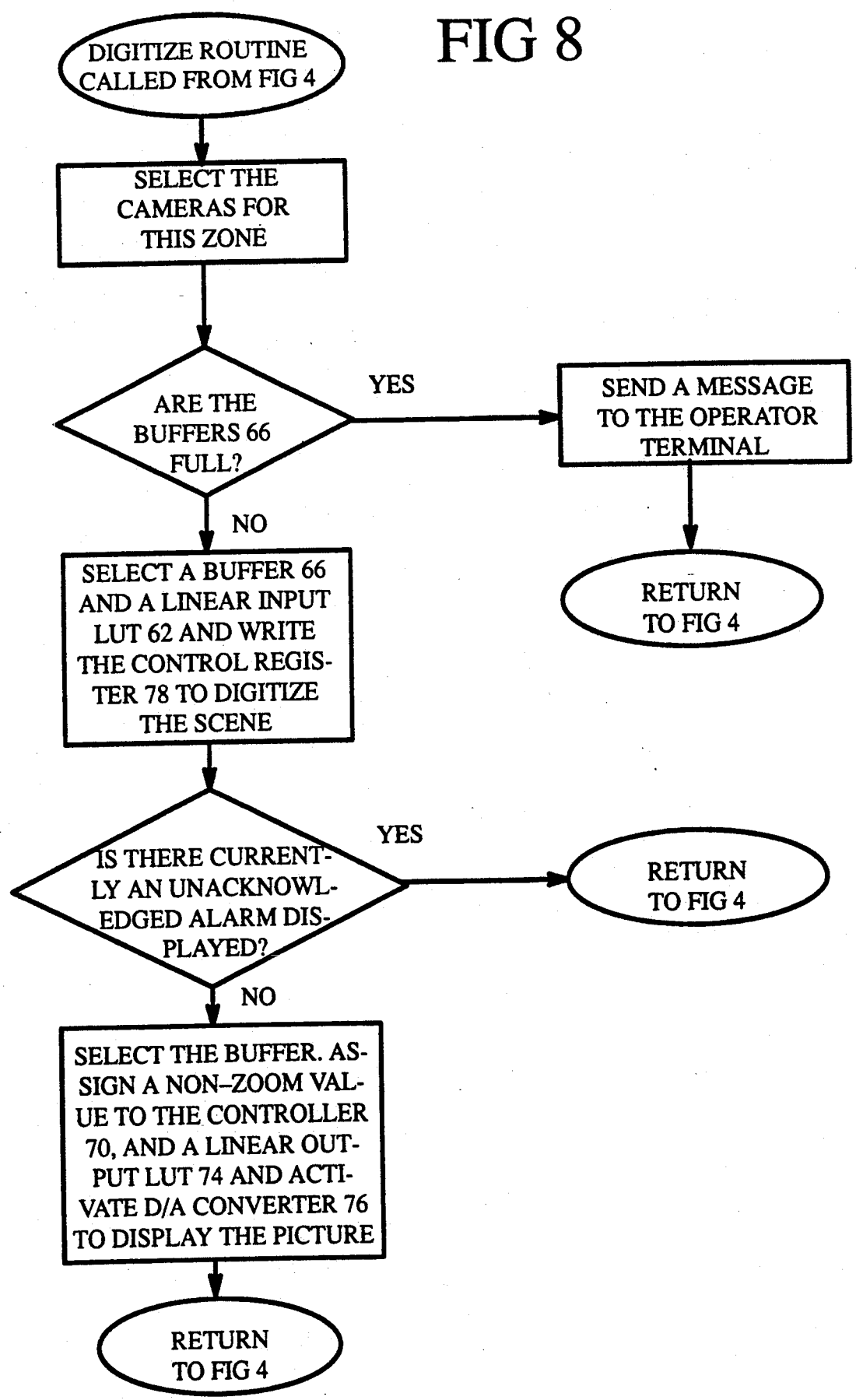

Returning to FIG. 4, when an alarm message is received (which as explained above may be generated by either the Keypad Process or the Alarm Process) the Digitize Routine of FIG. 8 is called. As shown in FIG. 8, the Digitize Routine first selects the two video signals corresponding to the zone of the new alarm message. The routine then checks to determine whether all of the buffers 66 are full. If so, an error message is sent to the operator terminal and no further action taken. Assuming one or more of the buffers 66 is available for use in each image digitizer 32, a buffer 66 is selected and an entry is made into the control register 78 of each image digitizer 32 to digitize the selected video signal V1-Vm via the A/D converter 60 and the input look-up table 62 and to store the digitized frame in the selected buffer 66. Once a video frame for each of the two video signals corresponding to the current alarm has been stored in one of the buffers 66 of each of the image digitizers 32, the routine of FIG. 8 then checks to determine whether there currently are unacknowledged alarms currently being displayed on the CRTs 42. If so, the routine returns to the Main Process of FIG. 4. Otherwise, if the CRTs 42 are free, a non-zoom value is set for the controller 70 and the linear output look-up table 74 is selected and then the D/A converter 76 is activated to display the stored video frames in the buffer 66 for the current alarm (with no magnification and with standard contrast) on the CRTs 42. If a previous alarm is being displayed, the Digitize Routine resets the zoom and pan logic controller 70 to the value it had prior to the most recent alarm in order not to override any previously requested magnification factor. Once this is accomplished, the routine of FIG. 8 returns to the Main Process of FIG. 4.

If the Main Process of FIG. 4 determines that the message is not a new alarm, it then checks to determine whether the message is a contrast adjustment command. If so, the contrast is adjusted by selecting a different output look-up table 74 on the requested image digitizer 32. As pointed out above, depending upon the overall brightness or darkness of the digitized image various ones of the non-linear output look-up tables 74 can be used to enhance visibility of unusually dark or unusually bright portions of the screen.

The Main Process of FIG. 4 then checks to determine whether the command is a zoom adjustment command. If so, the zoom is adjusted by selecting a different value for the controller 70 on the requested image digitizer 32.

Finally, the Main Process checks to determine whether a message is a clear command. If so, the image being displayed on the selected CRT 42 is cleared, and the next stored image from the associated image digitizer 32 is automatically displayed, if there are any.

The Digitizer Routine controls the video multiplexer 30 to apply the selected pair of the video signals V1-Vm to the image digitizers 32. The video multiplexer 30 preferably has a high switching speed for video signals such that the switching delay caused by the video multiplexer is less than 10 microseconds, and preferably less than 0.5 microseconds. A preferred video multiplexer 30 is shown in Appendix B, which provides such high switching speeds. This multiplexer has provisions for 32 input video signals plus one external input that can be used for a 33rd video signal, or for cascading inputs from another multiplexer to allow one of more than 32 video signals to be selected for output. The video multiplexer of Appendix B allows up to four video signals to be supplied as outputs, though only two channels are used in the system of FIG. 2. The video multiplexer of Appendix B utilizes a standard 6'u VME slave interface and a switch selectable VME A16 or A24 address. The selection/switching delay is under 10 microseconds and has been observed to be as low as 0.5 microseconds. This video multiplexer does not load existing video signals, thus enabling the multiplexer to be easily installed with existing systems.

As shown in FIG. 2, each video signal being digitized at a time requires a separate image digitizer 32. Thus, if only one video camera is provided for each zone, only one image digitizer 32 is required. Similarly, four image digitizers are required if four video cameras are provided for a zone and it is desired to digitize images from all four of these cameras simultaneously. The only limit on the number of cameras per zone is good security practice.

The image digitizer 32 includes four buffers 66 in this embodiment, but other equipment can be used if more buffers are required. Additionally, frames may be saved by copying digitized screens that have not been displayed from the buffers 66 onto the memory board 34 via the bus 24. Once this has been done, the computer 26 can then flag the buffer 66 as available for use in storing subsequent video screens. The copied frames can be moved back from the memory board 34 for display when requested by the operator. Furthermore, disc storage may be used to greatly increase the number of images stored. In this embodiment, the controller 70 is always set to a non-zoom value when a frame is stored in one of the buffers 66 to indicate that a full 512 by 480 element image is to be stored.

Returning to FIG. 2, after an alarm has been serviced by the computer system 22, the scene as observed by the video cameras in the alarmed zone at the time the alarm was received is now frozen on the CRTs 42. The total elapsed time for camera selection, image digitization and display is approximately 1/15th of a second. Two CRTs 42 are used in this embodiment because two video cameras are used for each zone. In general, the number of CRTs 42 used preferably equals the number of cameras monitoring each zone in order for an operator to make a fast assessment of the situation. However, other display methods such as stacking the digitized images or combining the images from multiple cameras onto a single CRT may be used in alternate embodiments. The total time between the tripping of an alarm and the display of the frozen video signal can be up to one hundred milliseconds, depending upon the type of transponder used. This response time is acceptable for most intrusion alarm systems. As a major use of this system is to add a video capture function onto an existing system, any commercial transponder that allows response within this time range is generally acceptable.

Once digitized images have been displayed for the operator on the CRTs 42, the operator can print either or both of these images using the selection switch 44 and video printer 46. To better assess an intrusion, the operator may enhance a displayed image by adjusting contrast or by magnifying a portion of the displayed image, or both. These features are especially useful in detecting intrusions in shadowy areas where existing systems have detection problems.

The operator can control contrast and magnification of the displayed images with the specially designed keypad 50 shown in FIG. 2. The keypad 50 is connected to a keypad interface 48 which scans the keypad 50 to determine which keys are depressed. The keypad interface converts keypad signals to XFER protocol, and transmits the XFER protocol message to the bus interface 28. The keypad commands are transmitted via the bus interface 28 to the computer 26. These keypad commands activate the Keypad Process shown in FIG. 6 and discussed above. Details of the presently preferred keypad 50 and interface 48 are shown in attached Appendix C.

If the operator wishes to magnify a section of a displayed image, he indicates which CRT 42 is displaying the screen he wishes to magnify. He also indicates which portion of the image he wishes to zoom in on. In the system 20, the digitized image is divided into nine sections, and the operator chooses one of these nine sections using the keypad 50. The keys AZ and BZ select the zoom feature for the two CRTs 42, respectively, and the keys 1-9 select the section to be zoomed in on. The keys 1-9 are laid out to represent the nine screen sections that may be enlarged. Thus, key 1 will zoom in on the upper left hand corner of the screen while key 5 will zoom in on the center ninth of the screen and key 9 will zoom in on the lower right hand corner of the screen. The 0 key restores the zoomed image to its original magnification. Once a zoom command is sent, it is processed by the Keypad Process and the Main Process as described above.

Contrast adjustments are made in a similar manner. The keypad keys AC and BC select contrast adjustment for the A and B CRTs 42, respectively, and the keys 1-7 select one of the 7 non-linear look-up tables 74. In the example of FIG. 3, one of the look-up tables 74 is a standard linear look-up table for normal contrast. The remaining seven are non-linear look-up tables used to enhance contrast in either unusually light or unusually dark portions of an image. In contrast adjustment the keys 1-7 are used, with key 1 making light images darker and key 7 making dark images lighter.

Contrast adjustment is accomplished by changing the values assigned to the 256 possible shades of grey. If for example a uniformly dark image is displayed using the linear look-up table it will contain only the lower numbered shades with little visual contrast. However, if the same image is displayed using one of the pre-programmed non-linear look-up tables, all dark values 0-64 can be assigned four times their original value, while all values 64-255 can be assigned the value 255. Thus, the dark areas will be transformed into a full scale of grey while the lighter areas will be shown as white.

The operator may also clear a CRT with the CLR key on the keypad 50 as discussed above in FIG. 4. This function is used when the system receives multiple alarms. If for example the sensors in Zone 2 sense an intrusion before the operator has acknowledged an alarm in Zone 1 and cleared the CRTs 42 of the stored video images, the video images from the cameras associated with Zone 2 will not be displayed immediately but will be stored in the buffers 66. Additional digitized images from additional alarms will be stored until all of the buffers 66 are filled, or until the operator releases a prior alarm. When the operator clears a prior alarm with the keypad 50, the previously displayed digitized images on the CRTs 42 are cleared, and stored video images from the buffers 66 are displayed in a first in, first out order. This is done by the Main Process of FIG. 4 as described, which clears the present image and displays a next image stored in the buffers 66 (if there is one) in response to a clear message.

The keypad 50 can also be used by the operator to command the display of digitized screens from the video signals V1-Vm corresponding to any particular one of the zones. This is done simply by pressing the two number zone assigned to the video cameras of interest.

The RE key is a reset key that can be used to delete an erroneous entry.

The keypad described above allows an operator to change the contrast or the magnification by depressing only two keys. However, other keypads can be used to accomplish the same function if desired.

If more than two cameras are used per zone, the keypad 50 may be modified to select additional CRTs 42. Additionally a keypad using more than two entries per command may be used. Of course, if the system is designed to have more than 7 non linear output look-up tables 74 or more than 9 zone segments the keypad 50 may be modified as appropriate. Finally, the presently preferred image digitizers allow for magnification of two times the original magnification. If other image digitizers are used which have a larger number of magnification levels, the keypad may be modified to add a variable zoom feature.

In order fully to define the presently preferred embodiment of system 20. Table 1 defines presently preferred components for various elements of FIG. 2. Note in particular that the bus interface 28, the video multiplexer 30 and the keypad 50 and interface 48 are shown in complete detail in Appendices A-C. Furthermore, Appendix D provides software for the software driven components of the system 22, including the computer 26, the interface 28 and the keypad interface 48. Appendix E provides further information regarding hardware and connection configurations for hardware using the software of Appendix D. Of course, this detailed information is not intended in any way to limit the scope of this invention, but is merely being provided to define the presently preferred embodiment of this invention.

TABLE 1

| REF. NO. | FUNCTION | IDENTIFICATION |
|---|---|---|
| 24 | Bus | Dawn VME Products 12 Slot VMEbus Chassis 11-1002920 (Fremont, CA) |
| 26 | Computer | Motorola MVME 104/105/106/107 |
|  | Operating System | Software Components Group, Inc. PSOS Rev. 4.13 (San Jose, CA) |
|  | Assembler | Oasys Corp. linker 68000 LINKER, Version 4.12 |
|  | Linker | Oasys Corp. assembler 68020/881 ASSEMBLER, Version 2.12 |
|  | C Compiler | Oasys Corp. cross-compiler Rev. 7.11 |
| 28 | Bus Interface | See Appendix A |
| 30 | Video Multiplexer | See Appendix B |
| 32 | Image Digitizer | Matrox Model VIP-1024A (Dorval, Canada) |
| 34 | Memory Board |  |
| 36 | Transponder (A/D Input Card) | ACROMAG AVME 9480 (Wixom, Mich.) |
| 38 | Transponder | Commonwealth Edison APARS Field Board |

TABLE 1-continued

| REF. NO. | FUNCTION | IDENTIFICATION |
|---|---|---|
| 40 | Transponder (Serial) | Sygetron Remote Multiplexing Unit |
| 46 | Video Printer | Mitsubishi Model P71U |
| 48, 50 | Keypad and Interface | See Appendix C |
| 52 | Operator Terminal | WYSE 60 |

As an alternative to a separate computer, operating system and compiler, a computer may be obtained with the PSOS operating system on PROMS from Io Incorporated of Tucson, Ariz. Io also supplies a C compiler. Alternative software operating systems and C library may be used. Microware Systems Corporation of Des Moines, Iowa supplies similar software under the name of OS-9 TM which should prove suitable for this application.

SECOND PREFERRED EMBODIMENT

As pointed out above, in some existing security systems an alarm is not received by the central station until a considerable delay after the alarm was triggered. When this is the case, if the controller freezes a video frame only after it receives an alarm, the frozen video frame may not assist in interpreting the alarm. In particular, if the delay between the triggering of the alarm and the freezing of the video frame is too great, an intruder may have left the field of view of the respective camera. It can be quite expensive to install a higher speed alarm reporting system, and the second preferred embodiment 100 of the monitoring system of this invention overcomes this problem.

Figure 9:
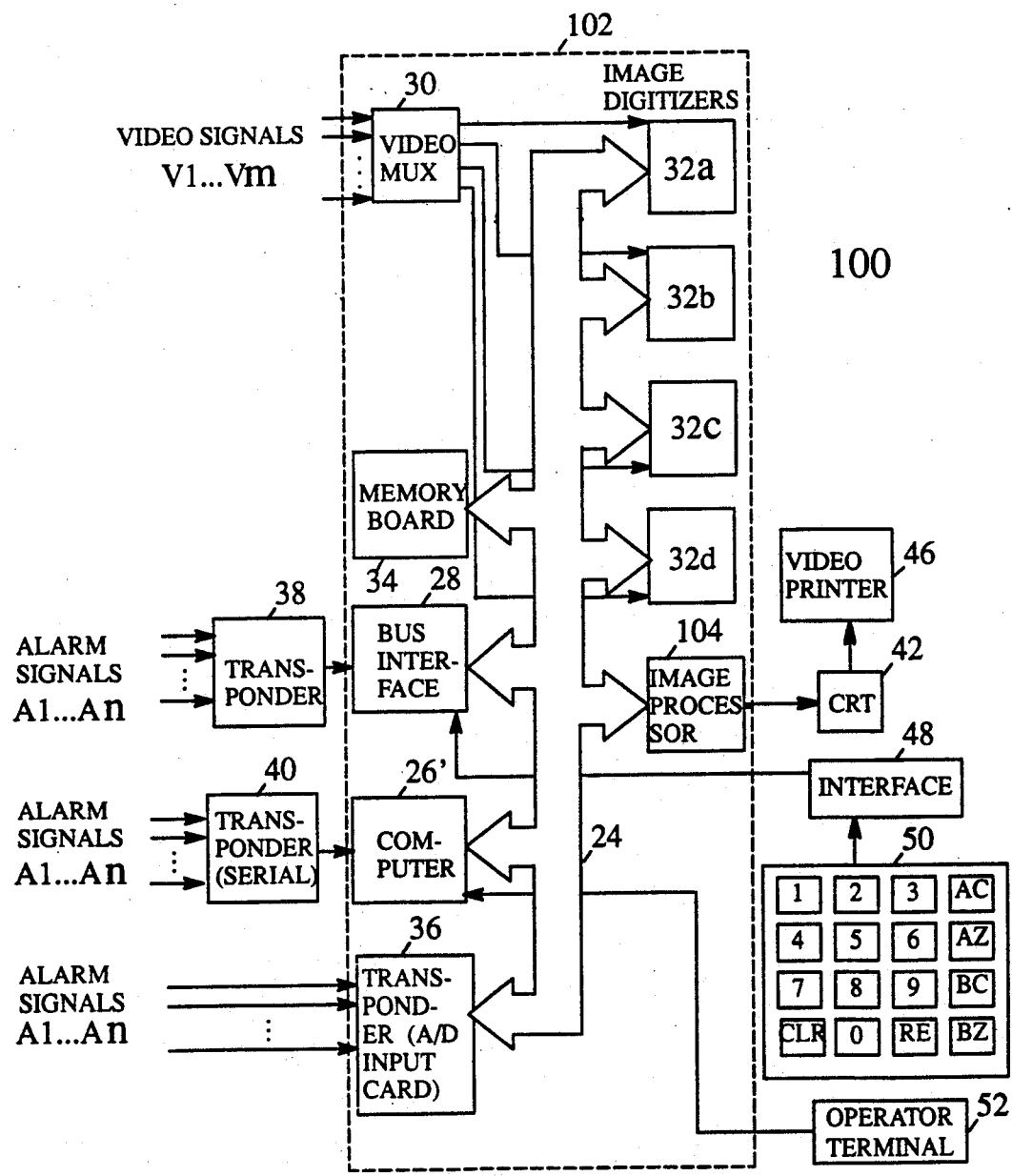
FIG. 9 is a block diagram of a second preferred embodiment of this invention.

The monitoring system 100 is shown in block diagram form in FIG. 9. In this embodiment, the system 100 includes a computer system 102 which utilizes many of the same hardware components as discussed above in conjunction with FIG. 2. Where this is the case the same reference numerals have been used, and the foregoing detailed description of these components should be referenced. In FIG. 9 the computer is indicated by reference numeral 26' to indicate that it is programmed differently from the computer 26 of FIG. 2. The monitoring system 100 is designed for an application having one video signal V1-Vn for each alarmed zone, but the system can readily be modified for use with systems having more cameras per zone. The image digitizers 32a-32d are each identical to the image digitizer 32 discussed above. Furthermore, the image process 104 can also be implemented using the same hardware as that used for the image digitizer 32 discussed above.

As before, the operator uses the operator terminal 52 to assign or delete cameras or activate or deactivate the video capture process for desired zones. Although any of the three transponder types 36, 38, 40 may be used, it will often be preferable to use the transponder 36 in the monitoring system 100 because of the ease of use, and the lower cost and complexity of interfacing the monitoring system 100 with existing security systems.

In the monitoring system 100 the video multiplexer 30 is used to send video signals to four image digitizers 32a-32d simultaneously. The image digitizers 32a-32d are configured differently from the image digitizer 32 discussed above, and FIG. 10 shows a block diagram of the digitizer 32a. A video signal received from the video multiplexer 30 is applied to an A/D converter 110. The digitized output of the A/D converter 110 is applied as an input to an input look-up table 112. The output of this look-up table 112 is then applied to a zoom and pan controller 114 and then via a switch 116 to one of four buffers 118. In this embodiment the controller 114 reduces the magnification of the digitized video image such that four images can be stored in each buffer. Thus, the four buffers 118 store up to sixteen separate video images. If more than sixteen images are required, an additional video multiplexer and additional image digitizers may be used.

Figure 11:
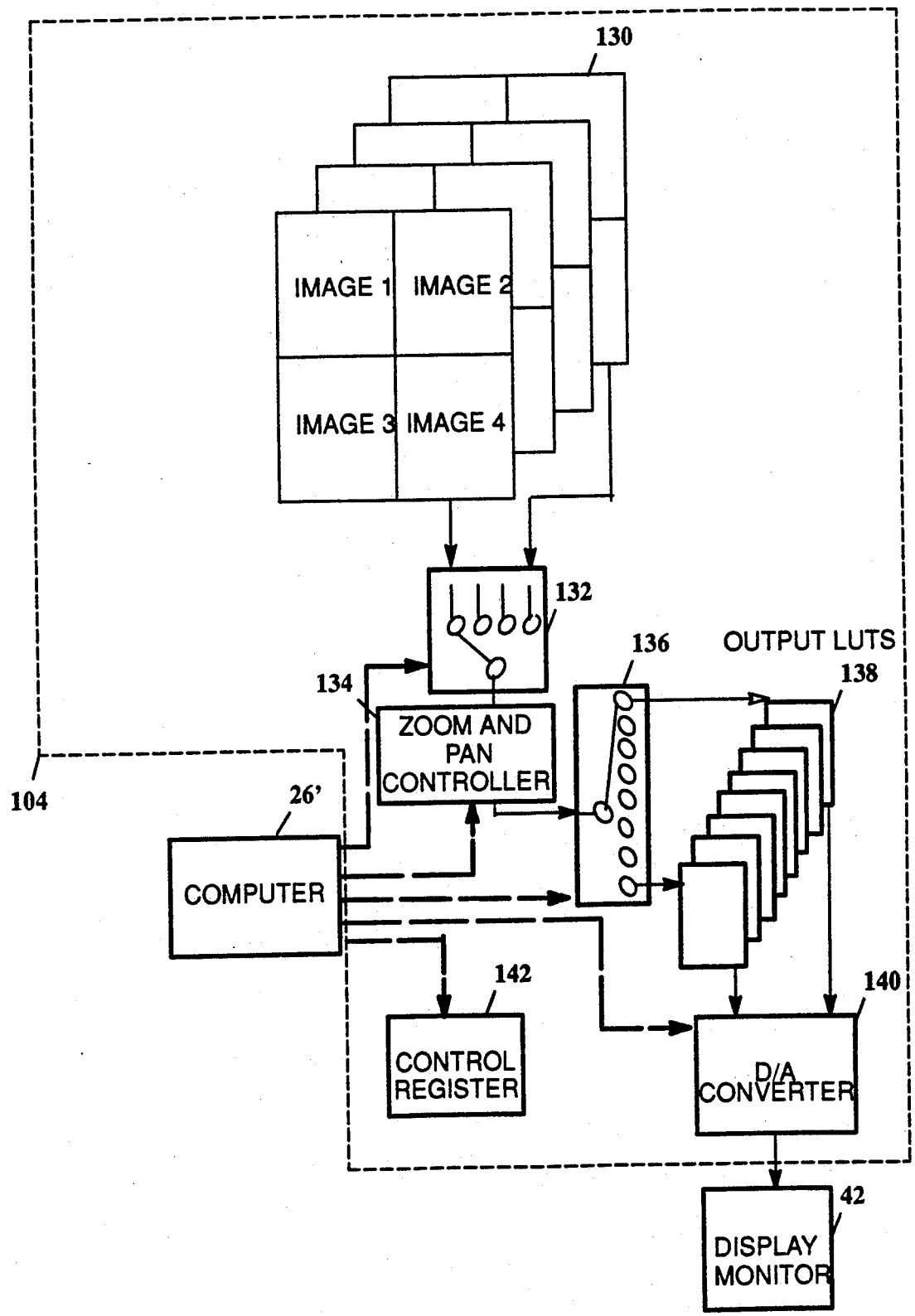
FIG. 11 is a more detailed block diagram of the image processor of FIG. 9.

FIG. 11 shows a block diagram of the image processor 104 which also contains four buffers 130, each of which can store up to four video images. Any one of the video images stored in the buffers 130 can be applied via a switch 132 to a zoom and pan controller 134 and then via a switch 136 to a selected one of eight output look-up tables 138. The output of the selected look-up table 138 is then applied via a D/A converter 140 to the CRT 42.

Figure 14:
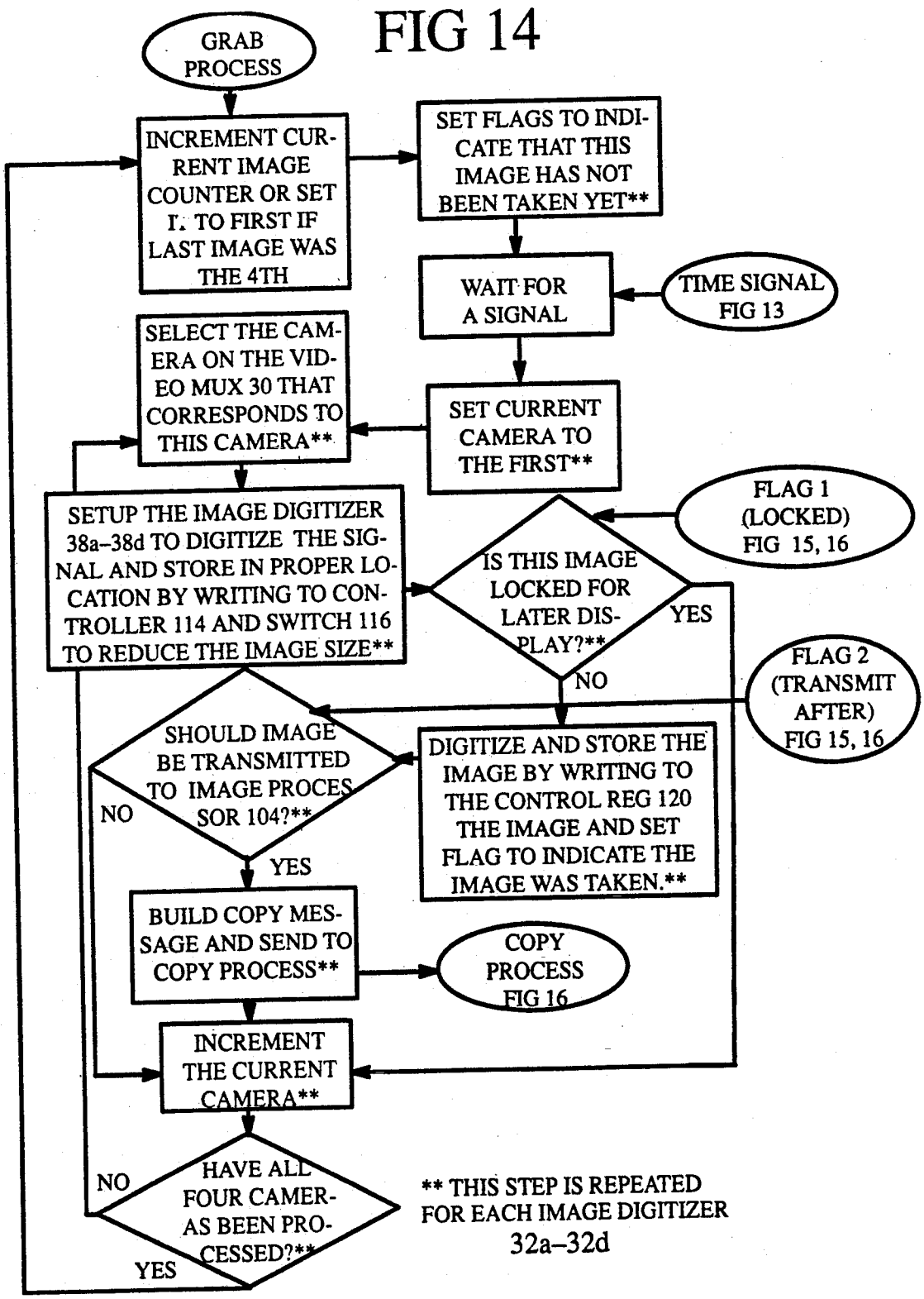

The computer 26' is programmed to control the image digitizers 32a-32d to digitize selected screens of the incoming video signals V1-Vn on an ongoing, repetitive basis, regardless of whether or not an alarm has been received. This function is controlled by the Grab Process flowcharted in FIG. 14. In general, the Grab Process of FIG. 14 controls the video multiplexer 30 so that initially images from a set of four cameras (for example, video signals V1, V5, V9, V13) are sent to the four image digitizers 32a-32d, respectively. Approximately 0.08 second later, the Grab Process of FIG. 14 switches the video multiplexer 30 to send a second set of four video signals (for example, V2, V6, V10, V14) to the respective image digitizers 32a-32d. This process is repeated approximately 0.08 second later for the third set of video signals (V3, V7, V11, V15) and approximately 0.08 second after that for the fourth set of video signals (V4, V8, V12, V16).

Figure 13:
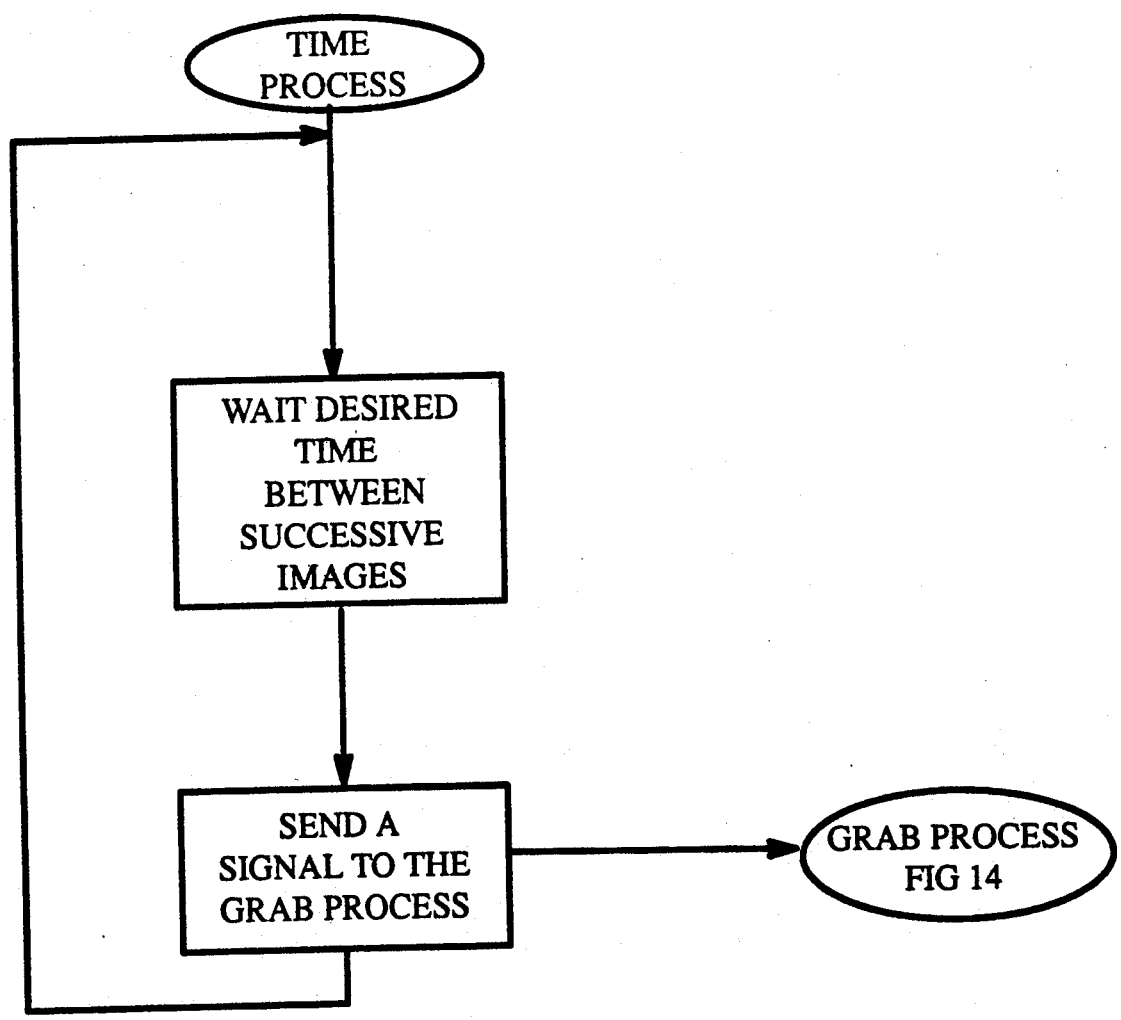

This embodiment is designed for use with sixteen video signals V1-V16 and in this embodiment the timing for the full cycle (in which a single video frame is digitized for each of the sixteen video signals V1-V16) is variable and is designated by the variable i. In this example, i is set at 0.50 second. However, i may be set from a minimum (for this embodiment) of 0.32 second up to any interval that good security practice will allow. This timing is controlled by the Time Process shown in FIG. 13.

The minimum full cycle time of 0.32 second in this example is the result of using sixteen video cameras with one video multiplexer 30 and four image digitizers 32a-32d. The minimum full cycle time can be changed depending upon the number of these elements used. For example, when only four cameras are used with one video multiplexer and four image digitizers, the full cycle time can be reduced to 0.08 second. Eight cameras with the same equipment will allow a minimum full cycle time of 0.16 second. Similarly, maintaining sixteen cameras but increasing the number of video multiplexers to 2 and the number of image digitizers to 8 would also allow a minimum full cycle time of 0.16 second. A designer should balance the cost of the additional hardware against the requirements of the individual security system.

Figure 10:
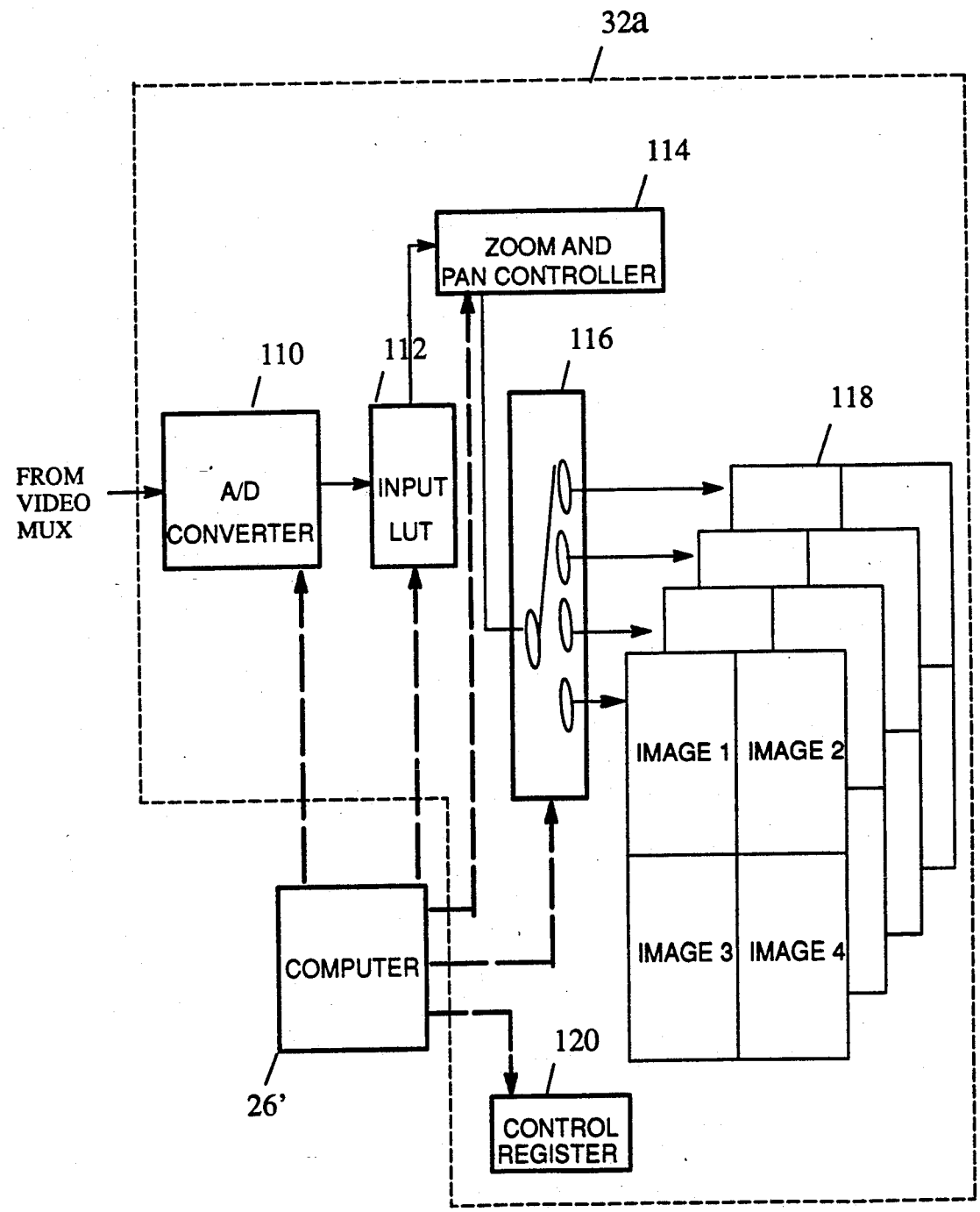
FIG. 10 is a more detailed block diagram of one of the image digitizers of FIG. 9.

As shown in FIG. 10, each video signal from the multiplexer 30 is digitized and then applied as an input to a look-up table 112 which is in this embodiment a linear look-up table as described above in conjunction with the first preferred embodiment. Unless the buffers 118 are locked because they contain images from a previous alarm, the Grab Process of FIG. 14 selects a buffer 118 for data storage by writing the buffer number into the switch 116. The Grab Process next sets the zoom and pan controller 114 to a zoom with a value that corresponds to the appropriate quadrant in the buffer 118 in which the digitized image will be stored. The stored image occupies a space of 256 by 240 elements instead of the full frame space of 512 by 480 elements. The Grab Process then uses the control register 120 to store the quadrant image as a 256 by 240 element digitized image in one quadrant of the respective buffer.

Over a full cycle one quadrant of all sixteen buffers 118 of the four image digitizers contain one 256 by 240 element digitized image for each video signal V1–V16. This process is repeated so that after four cycles (approximately 2 seconds in this example) the sixteen buffers of the four image digitizers each contain four 256 by 240 element digitized images from each camera. The images stored at time $t=n$ in the four buffers 118 of one image digitizers 32a–32d is shown in FIG. 17a. In FIG. 17a, i equals the time between successive images for a camera and x equals the software delay time to synchronize and digitize an individual image. In this example as explained above, i equals 0.5 second and x equals 0.08 second. FIG. 17b shows the pattern of stored images in the same buffers at the next cycle, at which t equals $n+i$. As shown in FIG. 17b, the Grab Process causes the digitized image generated in this next cycle at time t equals $n+i$ to overwrite the oldest stored image. This process repeats on an ongoing basis with each new digitized image overwriting the oldest digitized image in a buffer until the computer 26' receives an alarm signal or a request from the key pad 50.

Figure 12:
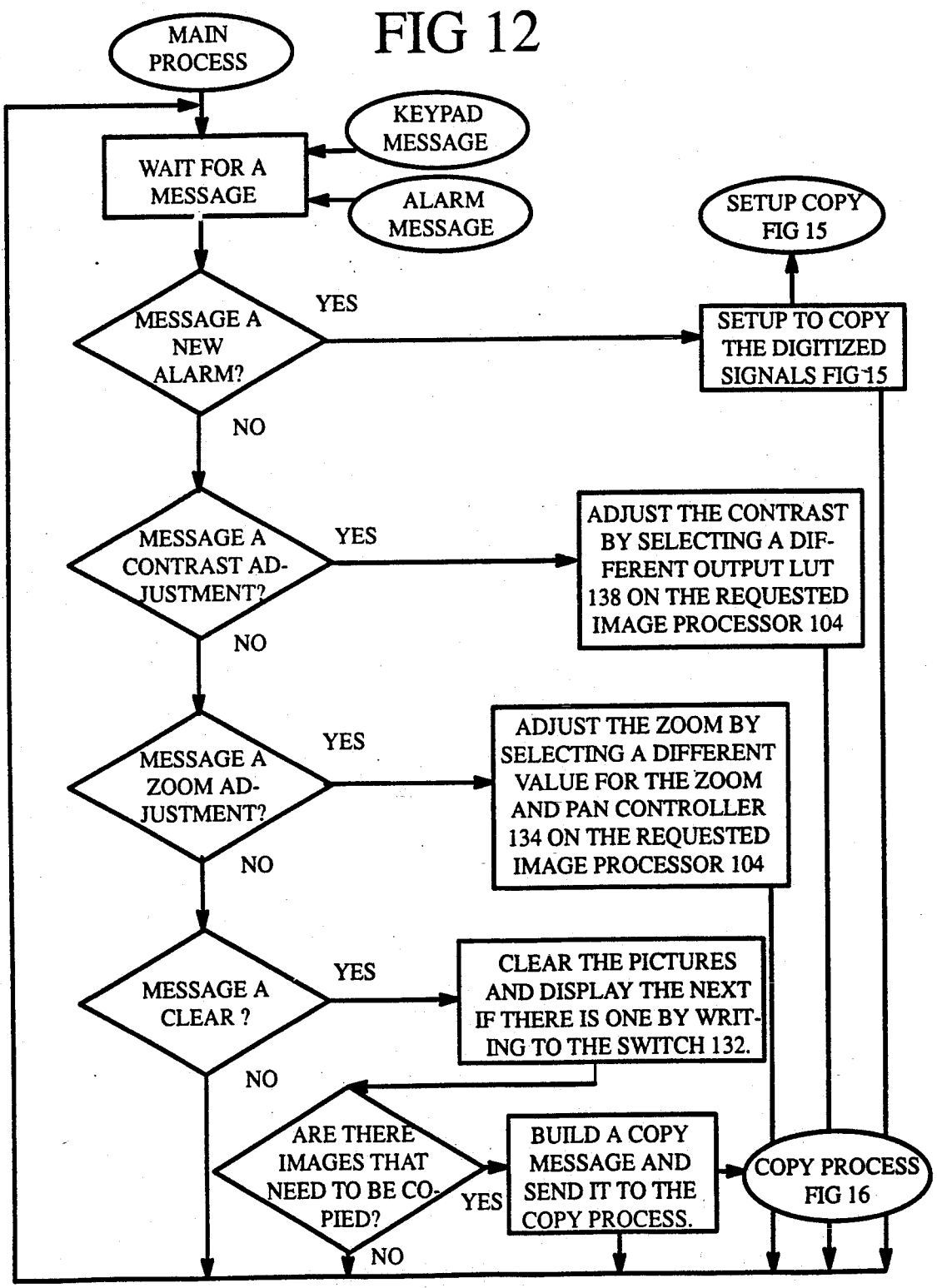
FIGS. 12–16 are flow charts of programs executed by the computer of FIG. 9.
Figure 15:
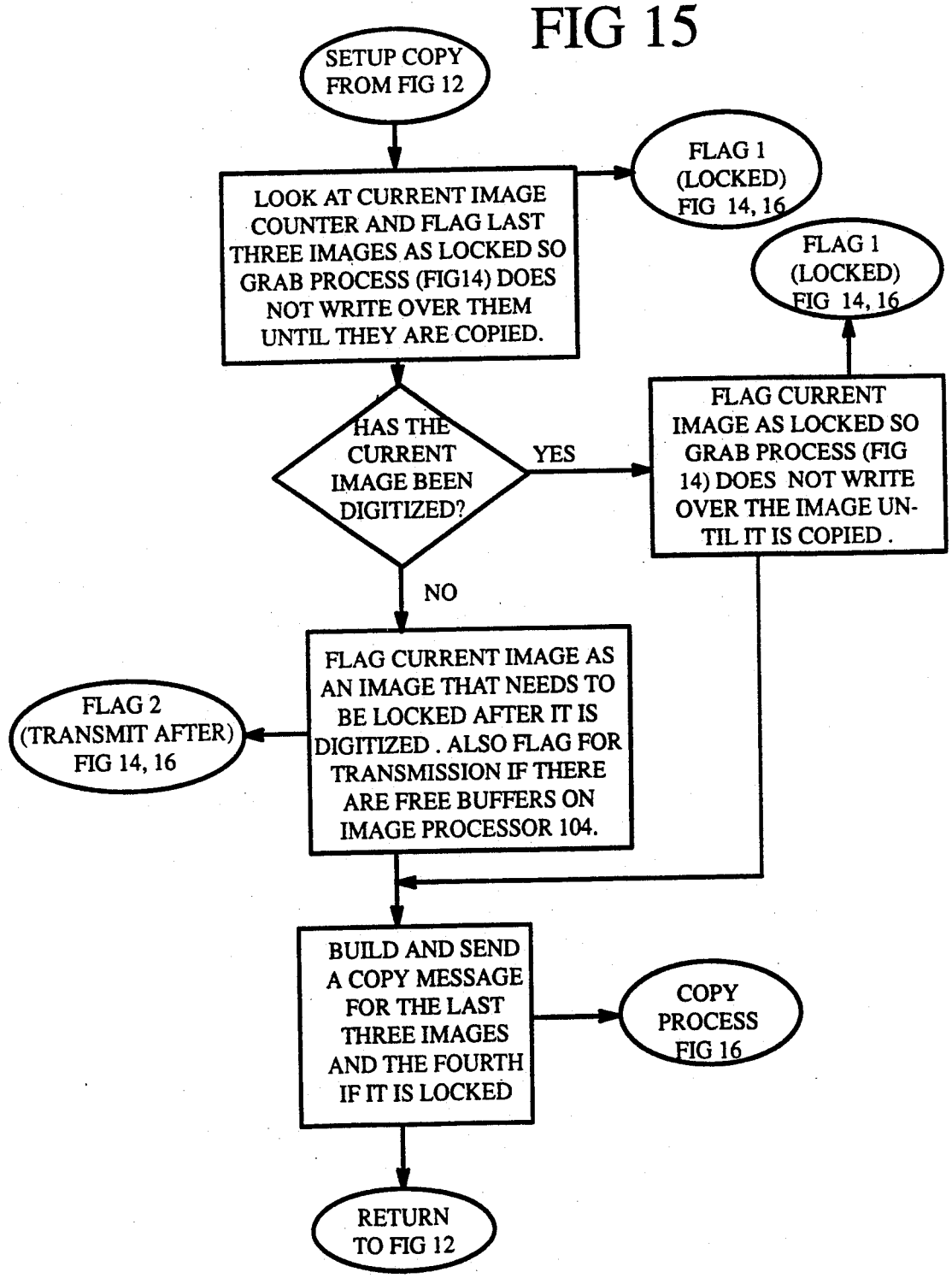

FIG. 12 shows a flow chart of the Main Process executed by the computer 26'. The Main Process simply waits for a message from the key pad 50 or from the Alarm Process, both as described above in conjunction with the first preferred embodiment. Once a message is received, it is then checked to determine whether it indicates a new alarm. If so, the Setup Copy Routine of FIG. 15 is called, which sends a message to the Copy Process of FIG. 16. The Copy Process in turn causes the last three images stored before the alarm or request to be transferred to a buffer 130 of the image processor 104 for storage and eventual display.

As shown in FIG. 15, the Setup Copy Routine first flags the last three images from the camera associated with the alarm as locked so that the Grab Process does not overwrite them until they are copied. The process then checks to determine whether the current image from the respective camera has been digitized. If so, the current image is locked so that the Grab Process does not overwrite it until it has been copied. Otherwise, the current image is flagged as one that needs to be locked after it is digitized and the three locked images are flagged for transmission to the image processor 104. Then a message is built and sent to the Copy Process for the last three images of the camera associated with the current alarm (and for the fourth image if it has already been locked).

Figure 16:
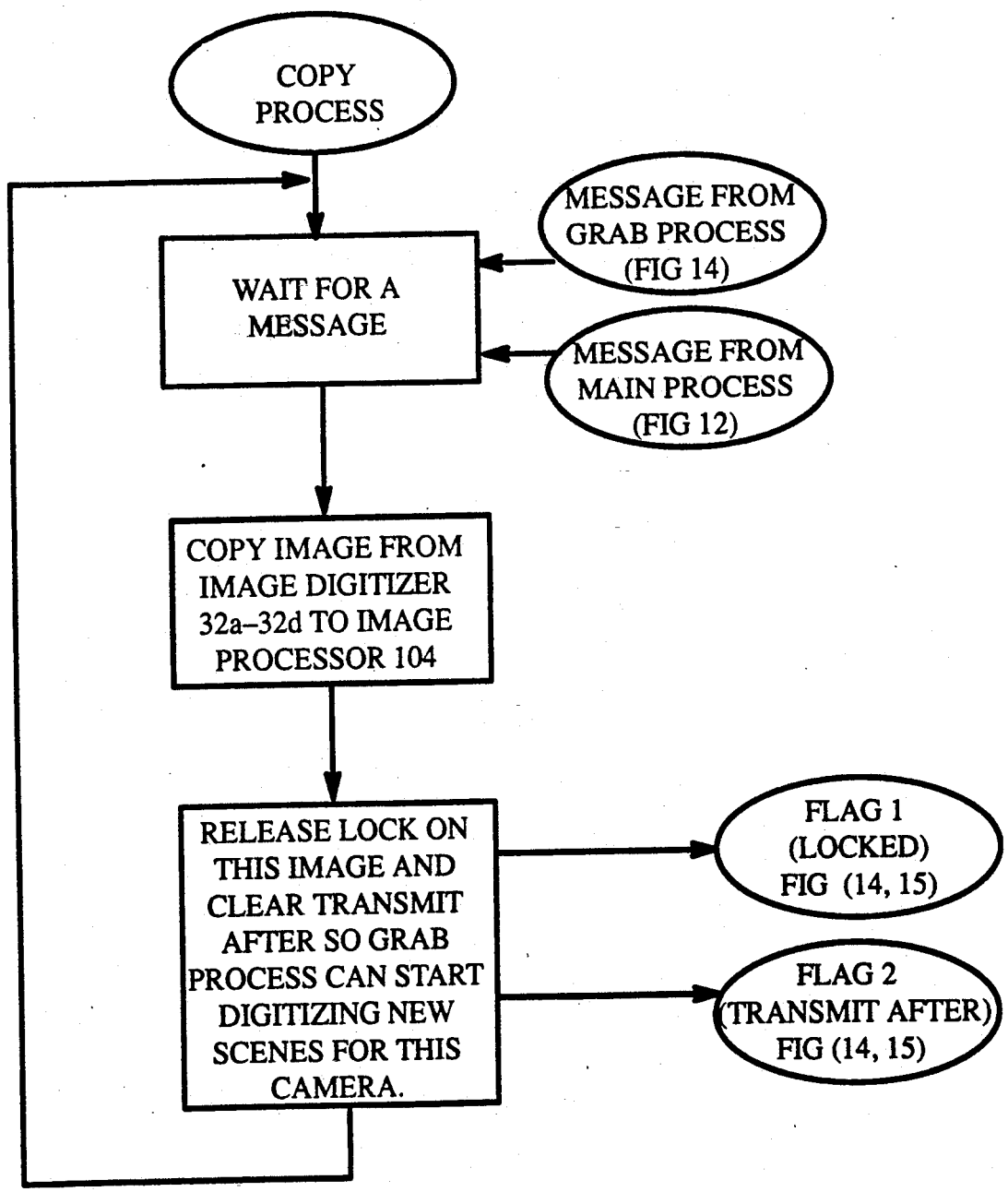

The Copy Process is shown in flow chart form in FIG. 16. This process waits for a message from either the Grab Process or the Main Process and then copies flagged images from one of the image digitizers 32a–32d to the image processor 104. After the images have been copied into the image processor 104 the lock is released on these images in the image digitizer so that the Grab Process can start digitizing new scenes for this camera.

As pointed out above, the Control Process for transmitting the fourth digitized image varies, depending on the time within the cycle when the alarm occurs. If the video signal for the camera corresponding to the current alarm has been digitized prior to the alarm being received by the computer 26', the fourth image is locked and the Copy Setup Process sends a message to the Copy Process to copy four digitized images from the buffers 118 to the buffers 130. On the other hand, if the video signal from the camera associated with the current alarm has not yet been digitized when the alarm is received by the computer 26', then the Grab Process builds a copy message and sends that message to the Copy Process. The Copy Process then accomplishes the transfer for the fourth image as described above.

It should be apparent that this invention is not limited to the display of three 256 by 240 element images taken before an alarm or request is received and one 256 by 240 element image taken after the alarm or request if received. By changing the Setup Copy Process and the Grab Process one can display two pictures taken before the alarm and two after, or one taken before the alarm and three taken after. By properly selecting the cycle times and the number of images copied from times before the alarm was received by the computer 26' one of the displayed images on the CRT 42 can be made to correspond in time approximately with the time the corresponding alarm was actually triggered (as opposed to the time the corresponding alarm was received by the computer 26').

Upon a second alarm or request, another set of four video images (three prior and one subsequent to the alarm or request) are transferred to a second buffer 130 in the image processor 104. The second set of digitized images may be from the same or from a different camera as the first set of images. Third and fourth sets of digitized images may be stored in the buffers 130 in a similar manner. Once these four buffers are full only one additional set of images of the camera may be stored, with storage occurring in the respective image digitizer 32a–32d. FIG. 18a shows the system where the first, second, third and fourth alarms occurred in the areas covered by camera 5, camera 2, camera 12, and camera 7, respectively. FIG. 18a indicates the contents of the buffers 130 of the image processor 104 in this condition. Only one further set of digitized images may be stored for each camera after this fourth alarm. The storage patterns for alarms 5–20 are shown in FIG. 18b, which represents the four buffers 118 of the four image digitizers 32a–32d. Until images are released from the image processor 104 (and replaced by the next alarm images in sequence) no further images will be stored as the Grab Process locks and protects the buffers against further overwriting. Thus, one can see that no images would be stored after the twenty-first alarm. Furthermore, if the sixth alarm were from camera 1 rather than from camera 5, no video images would be stored, because both the buffer assigned to camera 1 and the four buffers of the image processor 104 would be full.

When one of the buffers 130 of the image processor 104 receives a set of four images, corresponding to the first alarm, these images are automatically displayed on the CRT 42. Referring to FIG. 11, the zoom and pan logic controller 134 is initialized to a non-zoom value to indicate that the output image will not be magnified. The digitized image passes via the switch 136 which has been preinitialized to select the linear output look-up table 138, because no contrast adjustment has yet been selected. The set of four 256 by 240 element images are then automatically converted by the D/A converter 140 so that the four captured images are displayed as they are copied onto the CRT 42 in quadrant format.

In a manner similar to that described above in conjunction with the first preferred embodiment, the operator may enhance the displayed video picture by adjusting picture contrast, by magnifying one of the four images using the zoom feature, or both using the key pad 50 described above (FIG. 12). The only difference between the key pad in the two embodiments is that the key pad in the second embodiment does not need the keys for choosing between two CRTs 42. Of course, this feature would be used if the second embodiment were designed for use with a second image processor and a second display monitor.

If the operator wishes to magnify one of the four displayed pictures, he indicates which picture he wishes to zoom in on. When the Key Pad Process discussed above determines that the operator has sent a zoom command, the process builds a zoom message and sends it to the Main Process of FIG. 12. When the Main Process receives a zoom message from the key pad it writes a value into the zoom and pan logic controller 134 for the requested frame to indicate a zoom adjustment. The operator zooms in on the appropriate frame by a two key command. Depressing key AZ indicates a zoom and keys 1-4 indicate what frame (key 1 designates the picture in the upper left corner of the screen, key 2 the upper right, key 3 the lower left and key 4 the lower right). Upon zoom activation the selected picture will be magnified to fill the entire screen. Keying in the two keys AZ. 0 will remove the zoom enlargement and restore the four quadrant display.

Contrast adjustments are performed in a manner similar to that of the first embodiment. The operator depresses the key AC followed by one of the keys 1-7 to vary the contrast as previously described. If the four picture set is displayed prior to contrast adjustment, the contrast will be changed for the set of four pictures. If a zoomed image of one picture is being displayed, only the contrast of that one picture will be adjusted. As before, depressing the key AC followed by the key 0 will remove contrast adjustment.

The CLR key will clear the video display and erase the set of four images from storage in the image processor 104. The RE key will clear the key pad commands in an event of a mistake as described above.

Also, as described above, the system 100 allows the operator to select from the key pad a camera to view. As before, the operator can depress the camera numbers 0-16 if he wishes to view the area for any reason. As described above, the Key Pad Process builds an alarm message for that camera and the images (three prior to the request and one following the request) are passed to the image processor 104 as described above.

The hardware used in the presently preferred embodiment is the same as that identified above in Table 1. With respect to software, Appendix D provides the presently preferred program for the computer 26' as well as the programs for the bus interface 28 and the keypad interface 48. Appendix E provides configuration and connection information for hardware. As before, this information has been provided merely to define the presently preferred embodiment of this invention, and is not intended to be limiting in any way.

CONCLUSION

From the foregoing, it should be apparent that improved monitoring systems have been disclosed which automatically display still video images corresponding to the zones of an alarm, with a minimum of operator intervention. In these systems the operator needs only to clear one set of images to see the next, and no recorder rewinding is required. Furthermore, the systems are designed to store images for a plurality of alarms such that a first alarm does not prevent the system from recording still images for a second alarm. This enhances the reliability of the system. Finally, the second preferred embodiment functions particularly well with prior art sensor systems that report alarms slowly. Because video images are frozen on an ongoing basis, the system allows still images to be displayed from about the time when the alarm was triggered, even though this triggering time was well before the time the alarm was received by the monitoring system.

Of course, it should be understood that a wide range of changes and modifications can be made to the preferred embodiments described above. A wide variety of computer hardware and software and a wide variety of video processing components can be adapted for use with this invention. As explained above, the number of zones, the number of sensors, the number of cameras, as well as the exact configurations of video processing equipment can all be adapted as appropriate for the particular application. It is therefore intended that the foregoing detailed description be regarded as illustrative rather than limiting, and that it be understood that it is the following claims, including all equivalents, which are intended to define the scope of this invention.

We claim:

1. A video capture security system for rapidly generating on at least one video display device a still video image of an intrusion of a secured area, said secured area being monitored by a plurality of security sensors and a plurality of video cameras, each of said video cameras viewing a portion of said secured area, said video capture security system comprising:
    a. controlling means connected to said security sensors for determining which of said plurality of sensors has sensed an intrusion, and for determining which of said video cameras is viewing a corresponding portion of the secured area in which said intrusion was sensed;
    b. switching means connected to said plurality of video cameras and responsive to said controlling means for receiving a plurality of video input signals generated by said plurality of video cameras and switching to output at least one video signal as determined by said controlling means; and
    c. at least one real-time image digitizer, each of said at least one digitizer connected to said switching means and to one of said at least one video display device, and responsive to said controlling means for automatically digitizing said at least one video output signal to create at least one digitized video image, storing and processing for display said at least one digitized video image to generate on one of said at least one video display device said still video image of said portion of said secured area in which said intrusion was sensed;
    wherein said controlling means, switching means and at least one real-time image digitizer are interconnected by a high speed bus such that the switching means and the at least one real-time image digitizer are directly accessible by the controlling means via the bus.

2. The system of claim 1 wherein said controlling means comprises a digital computer.

3. The system of claim 1 wherein said switching means comprises a video multiplexer.

4. The system of claim 3 wherein said at least one video output signal comprises four video output signals, and wherein said video multiplexer further comprises means for receiving 33 of said plurality of video input signals and means for outputting said four video output signals.

5. The system of claim 4 wherein said video multiplexer switches said video input signals and outputs said video output signals with a switching delay no greater then about 10 microseconds.

6. The system of claim 4 wherein said video multiplexer switches said video input signals and outputs said video output signals with a switching delay no greater than about 0.5 microseconds.

7. The system of claim 1 wherein said at least one real-time image digitizer further comprises an analog to digital converter responsive to said at least one video output signal to produce a first digital signal, an input look-up table responsive to the first digital signal to produce a second digital signal, a plurality of buffers for storing the second digital, a plurality of buffers for storing the second digital signal, a selectable plurality of output look up tables responsive to the stored second digital signal to produce a contrast adjusted third digital signal, and a digital to analog converter responsive to the contrast adjusted third digital signal. signal, and a digital to analog converter responsive to the contrast adjusted/ third digital signal.

8. The system of claim 7 wherein said plurality of output look-up tables comprise a linear look-up table and a plurality of non-linear look-up tables.

9. The system of claim 8 wherein said input look-up table comprises a linear look-up table.

10. The system of claim 7 wherein said at least one real-time image digitizer further comprises means responsive to said controlling means for selecting one of the plurality of output look-up tables to select contrast of said at least one video output signal.

11. The system of claim 7 wherein said at least one real-time image digitizer further comprises means responsive to said controlling means for controlling magnification of said at least one video output signal.

12. The system of claim 1 further comprising first operator input means connected to said controlling means for commanding a change in magnification and contrast of said still video image and for commanding display of a subsequent still video image.

13. The system of claim 12 wherein said first operator input means comprises a keypad and a keypad interface.

14. The system of claim 1 or 4 or 7 wherein said controlling means, switching means and at least one real-time image digitizer together provide said still video image within approximately 1/15 second of intrusion sensing.

15. The system of claim 3 wherein said at least one video output signal comprises a plurality of video output signals, and wherein said video multiplexer further comprises means for receiving said plurality of video input signals and means for outputting said plurality of video output signals.

16. A video capture security system for rapidly generating on at least one video display device a still video image of a first intrusion of a secured area and at least one subsequent intrusion of said secured area, said secured area being monitored by a plurality of security sensors and a plurality of video cameras, each of said video cameras viewing a portion of said secured area, said video capture security system comprising:

a. controlling means connected to said plurality of security sensors for determining which of said plurality of sensors has sensed said first intrusion and which of said plurality of sensors has sensed said at least one subsequent intrusion, and for determining which of said plurality of video cameras is viewing said portions of said secured area in which said first intrusion and said at least one subsequent intrusion were sensed;

b. switching means connected to said plurality of video cameras and responsive to said controlling means for receiving a plurality of video input signals generated by said plurality of video input signals generated by said plurality of video cameras and switching to output a first video output signal and at least one subsequent video output signal as determined by said controlling means; and c. at least one real-time image digitizer, each of said at least one digitizer connected to said switching means and to one of said at least one video display device, and responsive to said controlling means for automatically digitizing said first video output signal and said at least one subsequent video output signal to create a first digitized video image and at least one subsequent digitized video image, storing said first digitized video image and said at least one subsequent digitized video image and processing for display said first digitized video image to generate on one of said at least one video display device a first still video image of said portion of said secured area in which said first intrusion was sensed;

wherein said controlling means, switching means and at least one real-time image digitizer are interconnected by a high speed bus such that the switching means and the at least one real-time image digitizer are directly accessible by the controlling means via the bus.

17. The system of claim 16 further comprising interface means connected to said controlling means for providing an interface to said controlling means, and a first operator input means connected to said interface means for receiving operator commands to change magnification and contrast of said first still video image, to signal said controlling means to display subsequent video images on one of said at least one video display device, and to change magnification and contrast of said subsequent still video images of said portion of said secured area in which said subsequent intrusion was sensed.

18. The system of claim 17 wherein said first operator input means comprises a key pad.

19. The system of claim 18 wherein said switching means switches said video input signals and outputs said at least one video output signal with a switching delay no greater than about 10 microseconds.

20. The system of claim 18 wherein said switching means switches said video input signals and outputs said at least one video output signal with a switching delay no greater than about 0.5 microseconds.

21. The system of claim 16 wherein said at least one real-time image digitizer further comprises an analog to digital converter responsive to said at least one video output signal to produce a first digital signal, an input look-up table responsive to the first digital signal to produce a second digital signal, a plurality of buffers for storing the second digital signal, a selectable plurality of output look-up tables responsive to the stored second digital signal to produce a contrast adjusted third digital signal, and a digital to analog converter responsive to the contrast adjusted third digital signal.

22. The system of claim 16 wherein said switching means comprises a plurality of outputs and means for switching to output a plurality of said video input signals, each to a respective one of said outputs.

23. In a video surveillance and intrusion alarm system of the type comprising means for generating a plurality of alarm signals, each associated with a respective zone; means for generating a plurality of video signals, each associated with a respective zone; and means for transmitting the video signals and the alarm signals to a central station, the improvement comprising:

at least one video image digitizer situated at the central station and operative to store at least one digitized still video image;

a controller situated at the central station and responsive to the alarm signals to apply selected ones of the video signals to the at least one image digitizer such that promptly after one of the alarm signals is generated, the respective video signal is automatically applied to the at least one image digitizer; and a display coupled to the at least one image digitizer to display the digitized video image stored by the at least one image digitizer, thereby automatically presenting to an operator a still video image of the zone associated with an alarm, taken at a time immediately after the alarm;

wherein said at least one image digitizer and controller are interconnected by a high speed bus such that the at least one image digitizer is directly accessible by the controller via the bus.

24. The invention of claim 23 wherein the controller comprises a video multiplexer comprising a plurality of signal inputs, each coupled to receive a respective one of the video signals, and a signal output coupled to the at least one image digitizer.

25. The invention of claim 23 wherein the at least one image digitizer comprises means for adjusting contrast of the digitized video image, and wherein the invention further comprises operator controlled means for controlling the contrast adjusting means.

26. The invention of claim 23 wherein the at least one image digitizer comprises means for adjusting magnification of the digitized video image, and wherein the invention further comprises operator controlled means for controlling the magnification adjusting means.

27. The invention of claim 23 wherein the at least one image digitizer comprises means for storing a plurality of digitized video images, and wherein the invention further comprises operator controlled means for selecting one of the stored digitized video images for display.

28. The invention of claim 23 wherein the system further comprises means for storing additional digitized video images associated with subsequent alarm signals during display of the first mentioned digitized video image.

29. The system of claim 24 wherein said at least one video image digitizer comprises a plurality of video image digitizers, and wherein said video multiplexer comprises a plurality of signal outputs, each coupled to a respective one of said video image digitizers.

30. A video capture security system for rapidly generating a set of sequential still video images on at least one video display device of an intrusion of a secured area, said secured area being monitored by a plurality of security sensors and a plurality of video cameras, each of said video cameras viewing a portion of said secured area, said video capture security system comprising:

a. controlling means connected to said plurality of security sensors for determining which of said plurality of sensors has sensed said intrusion and for determining which of said plurality of video cameras is viewing said portion of said secured area in which said intrusion was sensed;

b. switching means connected to said plurality of video cameras and responsive to said controlling means for receiving a plurality of video input signals generated by said plurality of video cameras and periodically switching to output a plurality of video output signals as determined by said controlling means;

c. at least one real-time image digitizer, each of said at least one digitizer connected to said switching means and responsive to said controlling means for periodically automatically digitizing at least one of said video output signals to create a plurality of digitized video images, storing said digitized video images as at least one set of digitized sequential video images, wherein later digitized video images are stored in place of earlier digitized video images in said at least one set of digitized sequential video images such that said at least one set of digitized sequential video images is periodically updated; and d. at least one real-time image processor, each of said at least one processor connected to said at least one digitizer and responsive to said controlling means for automatically, upon sensing of said intrusion, storing and processing for display on one of said at least one video display device said at least one set of digitized sequential video images, wherein said at least one set of digitized sequential video images shows said portion of said secured area in which said intrusion was sensed, before and after said intrusion was reported to said controlling means.

31. The system of claim 30 wherein said controlling means comprises a digital computer.

32. The system of claim 30 wherein said switching means comprises a video multiplexer.

33. The system of claim 32 wherein said plurality of video output signal comprises four video output signals, and wherein said video multiplexer further comprises means for receiving 33 of said plurality of video input signals and means for outputting said four video output signals.

34. The system of claim 32 wherein said video multiplexer switches said video input signals and outputs said video output signals with a switching delay no greater than about 10 microseconds.

35. The system of claim 32 wherein said video multiplexer switches said video input signals and outputs said video output signals with a switching delay no greater than about 0.5 microseconds.

36. The system of claim 30 wherein said at least one real-time image digitizer further comprises an analog to digital converter responsive to said at least one video output signal to produce a first digital signal, an input look-up table responsive to the first digital signal to produce a second digital signal, a plurality of buffers for storing the second digital signal, and wherein said at least one image processor comprises a selectable plurality of output look-up tables responsive to the stored second digital signal to produce a contrast adjusted third digital signal, and a digital to analog converter responsive to the contrast adjusted third digital signal.

37. The system of claim 36 wherein said plurality of output look-up tables comprise a linear look-up table and a plurality of non-linear look-up tables.

38. The system of claim 37 wherein said input look-up table comprises a linear look-up table.

39. The system of claim 37 wherein said at least one real-time image digitize further comprises means responsive to said controlling means for selecting one of the plurality of output look-up tables to select contrast of said at least one video output signal.

40. The system of claim 36 wherein said at least one real-time image processor further comprises means responsive to said controlling means for controlling magnification of said at least one video output signal.

41. The system of claim 30 further comprising first operator input means connected to said controlling means for commanding a change in magnification and contrast of said still video image and for commanding display of a subsequent still video image.

42. The system of claim 30 wherein said first operator input means comprises a keypad and a keypad interface.

43. The system of claim 30 wherein said at least one image digitizer comprises a plurality of image digitizers, and wherein said switching means comprises means for switching said plurality of video output signals in parallel to respective ones of said image digitizers.

44. In a video surveillance and intrusion alarm system of the type comprising means for generating a plurality of alarm signals, each associated with a respective zone; means for generating a plurality of video signals, each associated with a respective zone; and means for transmitting the video signals and the alarm signals to a central station, the improvement comprising:

at least one video image digitizer situated at the central station and operative to store on an ongoing basis a plurality of sets of digitized still video images, each set associated with a respective one of the video signals, each stored digitized still video image corresponding to a respective image time;

a controller situated at the central station and responsive to the alarm signals to automatically select at least one of the stored digitized still video images for display, said at least one selected digitized still video image corresponding for each of the alarm signals to the zone associated with that alarm signal, and said at least one selected digitized still video image corresponding to an image time prior to the time the respective alarm signal was received by the controller; and a display coupled to the at least one video image digitizer to display the at least one selected digitized still video image, thereby providing a view of the zone associated with an alarm signal as the zone appeared at a time prior to the time when the alarm signal was received by the controller.

45. The system of claim 44 wherein the transmitting means transmits the alarm signals to the central station with an average propagation delay, and wherein the at least one selected digitized still video image corresponds to an image time that precedes the time the respective alarm signal was received by the controller by an amount selected to compensate for the average propagation delay such that the at least one displayed digitized still video image provides surveillance personnel with a view of the zone associated with the alarm signal as the zone appeared at about the time when the alarm signal was generated.

46. The invention of claim 44 wherein the controller comprises a video multiplexer having a plurality of signal inputs, each coupled to receive a respective one of the video signals, and a signal output coupled to the at least one image digitizer.

47. The invention of claim 44 wherein the controller comprises means for adjusting contrast of the digitized video image and wherein the invention further comprises operator controlled means for controlling the contrast adjusting means.

48. The invention of claim 44 wherein the controller comprises means for adjusting magnification of the digitized video image, and wherein the invention further comprises operator controlled means for controlling the magnification adjusting means.

49. The invention of claim 44 wherein the controller comprises means for storing a plurality of digitized video images, and wherein the invention further comprises operator controlled means for selecting one of the stored digitized video images for display.

50. The invention of claim 44 wherein the system further comprises means for storing additional digitized video images associated with subsequent alarm signals during display of the first mentioned digitized video image.

51. The system of claim 44 wherein said at least one video image digitizer comprises a plurality of video image digitizers, and wherein said controller comprises a video multiplexer comprising a plurality of signal inputs, each coupled to receive a respective one of said video signals, and a plurality of signal outputs, each coupled to a respective one of said video image digitizers.

* * * * *

UNITED STATES PATENT AND TRADEMARK OFFICE
CERTIFICATE OF CORRECTION

PATENT NO. : 5,109,278

DATED : April 28, 1992

INVENTOR(S) : CHARLES H. ERICKSON et al.

It is certified that error appears in the above-identified patent and that said Letters Patent is hereby corrected as shown below:

ON THE TITLE PAGE

Under the heading "OTHER PUBLICATIONS", in the third line, please delete "Pro" and substitute therefor --PRO--.

Under the heading "OTHER PUBLICATIONS", in the fifth line, please delete "Pro" and substitute therefor --PRO--.

Column 1, line 38, after "82" please insert --,--.
Column 2, line 29, after "happens" please insert --,--.

Column 3, line 5, after "alarm" please insert --,--.

Column 4, line 21, after "signals" please insert --,--.
Column 4, line 23, after "below" please insert --,--.
Column 5, line 44, after "FIG. 2" please insert --,--.
Column 6, line 14, after "20" please insert --,--.
Column 6, line 29, after "inactivation" please insert --,--.
Column 7, line 45, after "image" please insert --,--.

UNITED STATES PATENT AND TRADEMARK OFFICE
CERTIFICATE OF CORRECTION

PATENT NO. : 5,103,278
DATED : April 28, 1992
INVENTOR(S) : Charles H. Erickson et al It is certified that error appears in the above-indentified patent and that said Letters Patent is hereby corrected as shown below:

Col. 8, line 6, please delete "6'u" and substitute therefor --6u--.

Col. 10, line 19, after "Additionally" please insert --,--.

Col. 16, line 50, Claim 1, after "video" please insert --output--
col. 17, lines 27 & 28, Claim 7, please delete "a plurality of buffe rs forstoring the second digital,"
Col. 17, lines 32-35, Claim 7, please delete "signal, and a digital to analog converter responsive to the contrast adjusted/ third digital signal".

Col. 18, lines 21-22, please delete "said plurality of video inout signals".

Signed and Sealed this

Twenty-second Day of March, 1994

Attest:

BRUCE LEHMAN

*Attesting Officer*  *Commissioner of Patents and Trademarks*